(12) United States Patent
Cochran et al.

(10) Patent No.: US 7,653,963 B2
(45) Date of Patent: Feb. 2, 2010

(54) AC/DC HAND PORTABLE WET/DRY VACUUM HAVING IMPROVED PORTABILITY AND CONVENIENCE

(75) Inventors: John R Cochran, Baltimore, MD (US); Jason M Goger, Severna Park, MD (US); Daniel N Lopano, Towson, MD (US); Christine H Potter, Baltimore, MD (US); James B Watson, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 558 days.

(21) Appl. No.: 10/640,267

(22) Filed: Aug. 13, 2003

(65) Prior Publication Data

US 2004/0088817 A1    May 13, 2004

Related U.S. Application Data

(60) Provisional application No. 60/425,371, filed on Nov. 12, 2002.

(51) Int. Cl.
*A47L 9/28* (2006.01)

(52) U.S. Cl. .................. 15/323; 15/327.2; 15/327.5; 15/327.6; 15/DIG. 1

(58) Field of Classification Search .......... 15/301, 15/314, 323, 327.1, 327.2, 327.5, 327.6, 15/339, DIG. 1
See application file for complete search history.

(56) References Cited

U.S. PATENT DOCUMENTS

| | | |
|---|---|---|
| 1,260,282 A | 3/1918 | Harrold |
| 1,936,761 A | 11/1933 | Hoover |
| 1,963,944 A | 6/1934 | Hahn, Jr. et al. |
| 2,114,780 A | 4/1938 | Juetson |
| 2,175,647 A | 10/1939 | Replogle |
| 2,218,035 A | 10/1940 | Benson |

(Continued)

FOREIGN PATENT DOCUMENTS

CH    575 748    5/1976

(Continued)

OTHER PUBLICATIONS

Ryobi Operator's Manual Tuff Sucker™ 18 Volt Cordless Hand Vac Model No. VC180.

(Continued)

*Primary Examiner*—David A Redding
(74) *Attorney, Agent, or Firm*—Harness, Dickey & Pierce, P.L.C.

(57) ABSTRACT

A wet/dry utility vacuum with a canister, a powerhead assembly with a fan, a shut-off device that prevents the fan from drawing liquids into the fan inlet when a volume of the liquid in the canister exceeds a predetermined volume. The powerhead assembly includes a controller that permits the utility vacuum to be operated in a desired power mode so that the user may employ either an AC power source or a DC power source, such as a battery pack, for example. In some applications, the battery pack may be interchangeable with the battery packs of various cordless tools, including drill/drivers and saws. A tool set and a method for operating a battery-powered tool set are also provided.

13 Claims, 18 Drawing Sheets

U.S. PATENT DOCUMENTS

| | | |
|---|---|---|
| 2,233,167 A | 2/1941 | Holm-Hansen |
| 2,276,844 A | 3/1942 | Holm-Hansen |
| 2,380,382 A * | 7/1945 | Baker .......................... 55/334 |
| 2,642,616 A | 6/1953 | Browne |
| 2,757,753 A | 8/1956 | Kasper |
| 2,769,999 A | 11/1956 | Sheahan |
| 2,884,185 A | 4/1959 | Dolan |
| 2,898,621 A | 8/1959 | Vance |
| 3,040,362 A | 6/1962 | Krammes |
| 3,060,082 A | 11/1962 | Rosenberg |
| 3,220,638 A | 11/1965 | Petersen |
| 3,383,765 A | 5/1968 | Meltzer |
| 3,525,912 A | 8/1970 | Wallin |
| 3,550,181 A | 12/1970 | Dolan et al. |
| 3,599,273 A | 8/1971 | Shirayanagi et al. |
| 3,730,642 A | 5/1973 | Barnstead et al. |
| 3,771,191 A | 11/1973 | Cain |
| 3,869,265 A | 3/1975 | Wolter et al. |
| 3,874,023 A | 4/1975 | Tschudy |
| 3,879,797 A | 4/1975 | Principe et al. |
| 3,930,281 A | 1/1976 | Principe et al. |
| 3,970,912 A | 7/1976 | Hoffman |
| 4,050,113 A | 9/1977 | Wright et al. |
| 4,080,104 A | 3/1978 | Brown, Jr. |
| 4,120,616 A | 10/1978 | Dwyer et al. |
| 4,171,553 A | 10/1979 | Stein |
| 4,171,580 A | 10/1979 | Vabrinskas |
| 4,179,768 A | 12/1979 | Sawyer |
| 4,185,974 A | 1/1980 | Hiester |
| 4,250,592 A | 2/1981 | Emrick |
| 4,373,228 A | 2/1983 | Dyson |
| 4,393,536 A | 7/1983 | Tapp |
| 4,536,914 A | 8/1985 | Levine |
| 4,541,142 A | 9/1985 | Pudwill |
| 4,549,329 A | 10/1985 | St. Clair |
| 4,623,366 A | 11/1986 | Berfield et al. |
| D289,097 S | 3/1987 | Takahashi et al. |
| 4,698,530 A | 10/1987 | Thomson |
| 4,745,654 A | 5/1988 | Yamamoto et al. |
| 4,748,712 A | 6/1988 | DiGiovanni |
| 4,824,333 A | 4/1989 | Erickson, Jr. |
| 4,831,685 A | 5/1989 | Bosyj et al. |
| 4,845,793 A | 7/1989 | Meyer |
| 4,910,828 A | 3/1990 | Blase et al. |
| 4,920,608 A | 5/1990 | Hult et al. |
| 4,938,309 A | 7/1990 | Emdy |
| 4,947,514 A | 8/1990 | Gerke, Jr. et al. |
| 4,959,885 A | 10/1990 | Sovis et al. |
| 4,993,106 A | 2/1991 | Hult et al. |
| 5,005,252 A | 4/1991 | Steiner et al. |
| 5,025,529 A | 6/1991 | Hult et al. |
| 5,035,024 A | 7/1991 | Steiner et al. |
| 5,114,572 A | 5/1992 | Hunter et al. |
| 5,205,014 A | 4/1993 | Yoo |
| 5,208,940 A | 5/1993 | London et al. |
| 5,353,469 A | 10/1994 | Fellhauer |
| D352,146 S | 11/1994 | Wulff |
| 5,388,301 A | 2/1995 | Bosyj et al. |
| 5,388,303 A | 2/1995 | Hemmann et al. |
| 5,388,308 A | 2/1995 | Meeuwissen |
| 5,404,614 A | 4/1995 | Stephens |
| RE34,980 E | 6/1995 | Rau et al. |
| 5,455,984 A | 10/1995 | Blase |
| 5,504,970 A | 4/1996 | Neshat et al. |
| D370,319 S | 5/1996 | Bass et al. |
| 5,528,794 A | 6/1996 | Tomasiak |
| 5,561,885 A | 10/1996 | Zahuranec et al. |
| D376,228 S | 12/1996 | Bass et al. |
| 5,586,358 A | 12/1996 | Wolfe et al. |
| 5,586,360 A | 12/1996 | Diederiks, Jr. et al. |
| 5,592,716 A | 1/1997 | Moren et al. |
| 5,599,401 A | 2/1997 | Brosky et al. |
| 5,608,945 A | 3/1997 | Crouser et al. |
| 5,623,744 A | 4/1997 | Triplett et al. |
| 5,644,815 A | 7/1997 | Bosyj et al. |
| D386,842 S | 11/1997 | Hoshino et al. |
| D389,962 S | 1/1998 | Berfield et al. |
| 5,787,546 A | 8/1998 | Bass et al. |
| 5,836,046 A | 11/1998 | Huffman et al. |
| 5,844,328 A | 12/1998 | Furst |
| 5,869,947 A | 2/1999 | Zahuranec et al. |
| 5,870,798 A | 2/1999 | Crouser et al. |
| 5,943,732 A | 8/1999 | Bosyj et al. |
| 5,954,863 A | 9/1999 | Loveless et al. |
| 5,969,954 A | 10/1999 | Zaitsu |
| 5,998,965 A | 12/1999 | Carlucci et al. |
| 6,003,300 A | 12/1999 | Bates |
| D418,643 S | 1/2000 | Hoshino |
| 6,044,519 A | 4/2000 | Hendrix |
| D430,365 S | 8/2000 | Roberts et al. |
| 6,101,669 A | 8/2000 | Martin et al. |
| 6,104,162 A | 8/2000 | Sainsbury et al. |
| 6,113,663 A | 9/2000 | Liu |
| 6,141,823 A | 11/2000 | Fujiwara et al. |
| 6,154,919 A | 12/2000 | Hetko |
| 6,156,198 A | 12/2000 | Bartels |
| 6,172,437 B1 | 1/2001 | Du |
| 6,175,988 B1 | 1/2001 | White et al. |
| 6,181,029 B1 | 1/2001 | Berglund et al. |
| 6,192,551 B1 | 2/2001 | Roth |
| 6,219,880 B1 | 4/2001 | Worden et al. |
| D443,960 S | 6/2001 | Shimko et al. |
| 6,300,744 B1 | 10/2001 | Shum |
| 6,347,428 B1 | 2/2002 | Shimko et al. |
| 6,363,574 B2 | 4/2002 | Worden et al. |
| 6,434,785 B1 | 8/2002 | Vandenbelt et al. |
| 6,440,191 B1 | 8/2002 | Berfield et al. |
| D462,488 S | 9/2002 | Santiago et al. |
| 6,448,732 B1 | 9/2002 | Block |
| 6,451,078 B2 | 9/2002 | Berfield et al. |
| 6,459,604 B1 | 10/2002 | Youn et al. |
| 6,497,001 B2 | 12/2002 | Di Nunzio et al. |
| 6,499,182 B2 | 12/2002 | Berfield et al. |
| 6,620,223 B2 | 9/2003 | Bloomer |
| 2002/0066153 A1 | 6/2002 | Sclafani et al. |
| 2002/0121000 A1 | 9/2002 | Tyler |
| 2002/0189048 A1 | 12/2002 | Maruyama et al. |
| 2003/0145417 A1 | 8/2003 | Lee |

FOREIGN PATENT DOCUMENTS

| | | |
|---|---|---|
| CH | 575748 | 5/1976 |
| DE | P 14 53 075.7 | 12/1969 |
| DE | 78 07 797 | 3/1978 |
| DE | 29 45 865 | 11/1979 |
| DE | EP 0 017 646 | 3/1980 |
| DE | 80 13 467 | 5/1980 |
| DE | P 27 41 911.0 | 8/1980 |
| DE | 82 22 409.9 | 8/1982 |
| DE | 34 05 749 | 2/1984 |
| DE | P 34 29 565.8 | 2/1986 |
| DE | 35 44 742 | 6/1987 |
| DE | P 35 43 376.0 | 6/1987 |
| DE | 88 01 964.0 | 2/1988 |
| DE | 38 32 648 | 9/1988 |
| DE | 37 22 701 | 12/1988 |
| DE | EP 0 437 017 A1 | 7/1991 |
| DE | 41 26 320 | 8/1991 |
| DE | 92 00 148 | 1/1992 |
| DE | 92 00 522 | 1/1992 |
| DE | 42 37 774 | 11/1992 |
| DE | 43 38 330 | 10/1993 |
| DE | EP 0 388 676 B1 | 10/1993 |
| DE | 43 17 002 | 4/1994 |

| | | |
|---|---|---|
| DE | 44 13 243 | 4/1994 |
| DE | 96 01 589 | 2/1996 |
| DE | 196 00 671.6 | 7/1996 |
| DE | 96 07 135 | 8/1996 |
| DE | 97 00 637 | 1/1997 |
| DE | 97 03 516 | 4/1997 |
| DE | EP 0 898 921 | 3/1999 |
| DE | 197 36 595 C2 | 6/2001 |
| DE | EP 1 222 891 A2 | 7/2002 |
| DM | 005 742 | 8/1985 |
| DM | 023 075 | 6/1992 |
| DM | 040 832 | 7/1997 |
| EP | 0 610 545 | 9/1993 |
| EP | 0564817 A1 | 10/1993 |
| EP | 0 537 470 | 1/1996 |
| EP | 0 729 211 | 8/1996 |
| EP | 0 903 404 | 3/1999 |
| EP | 0 956 806 | 4/1999 |
| FR | 2690328 | 10/1993 |
| WO | WO 02/074150 A1 | 9/2002 |
| WO | WO 02/080750 | 10/2002 |

OTHER PUBLICATIONS

Ryobi Operator's Manual 7.2 Volt Cordless Hand Vac Model No. VC722.

Sharp Corporation Press Release "EC-CL20 Functions as Both Cordless Cleaner and AC Powered Cleaner, a World-First* for a Cyclonic Vacuum Cleaner" dated Feb. 1, 2002.

* cited by examiner

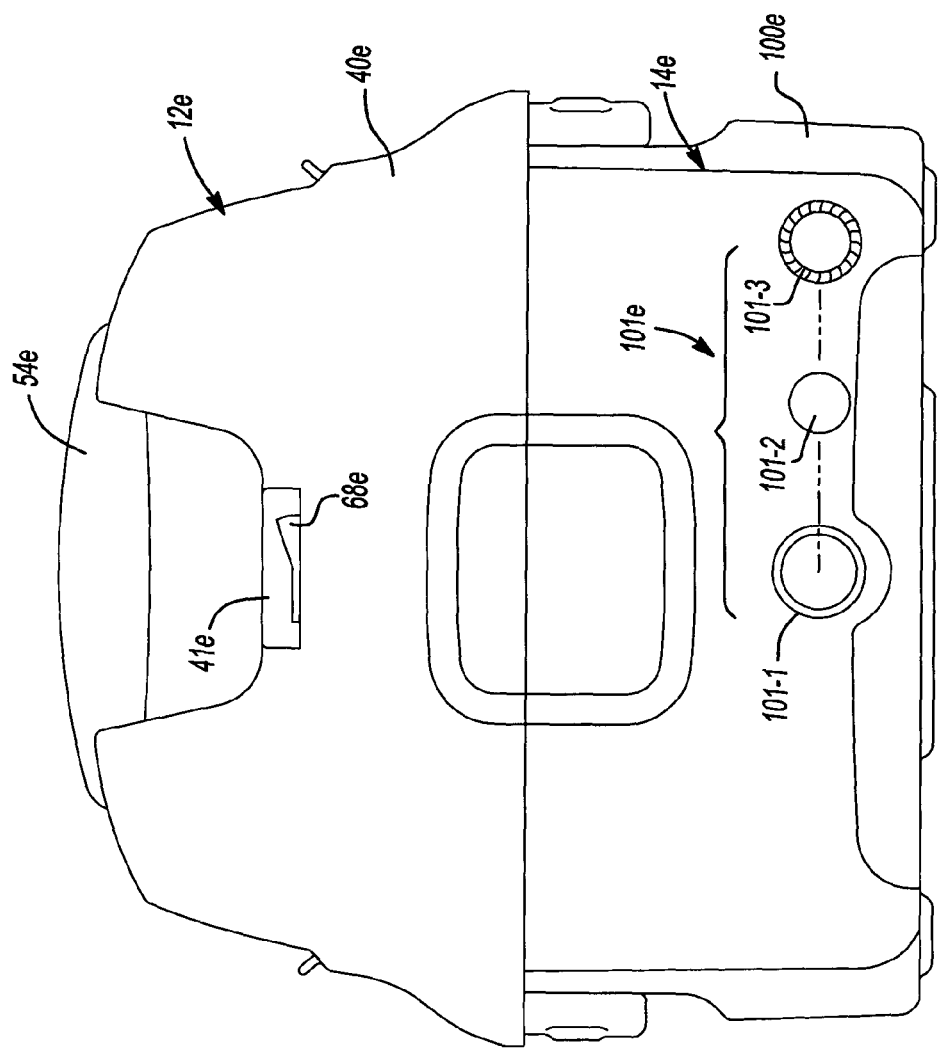

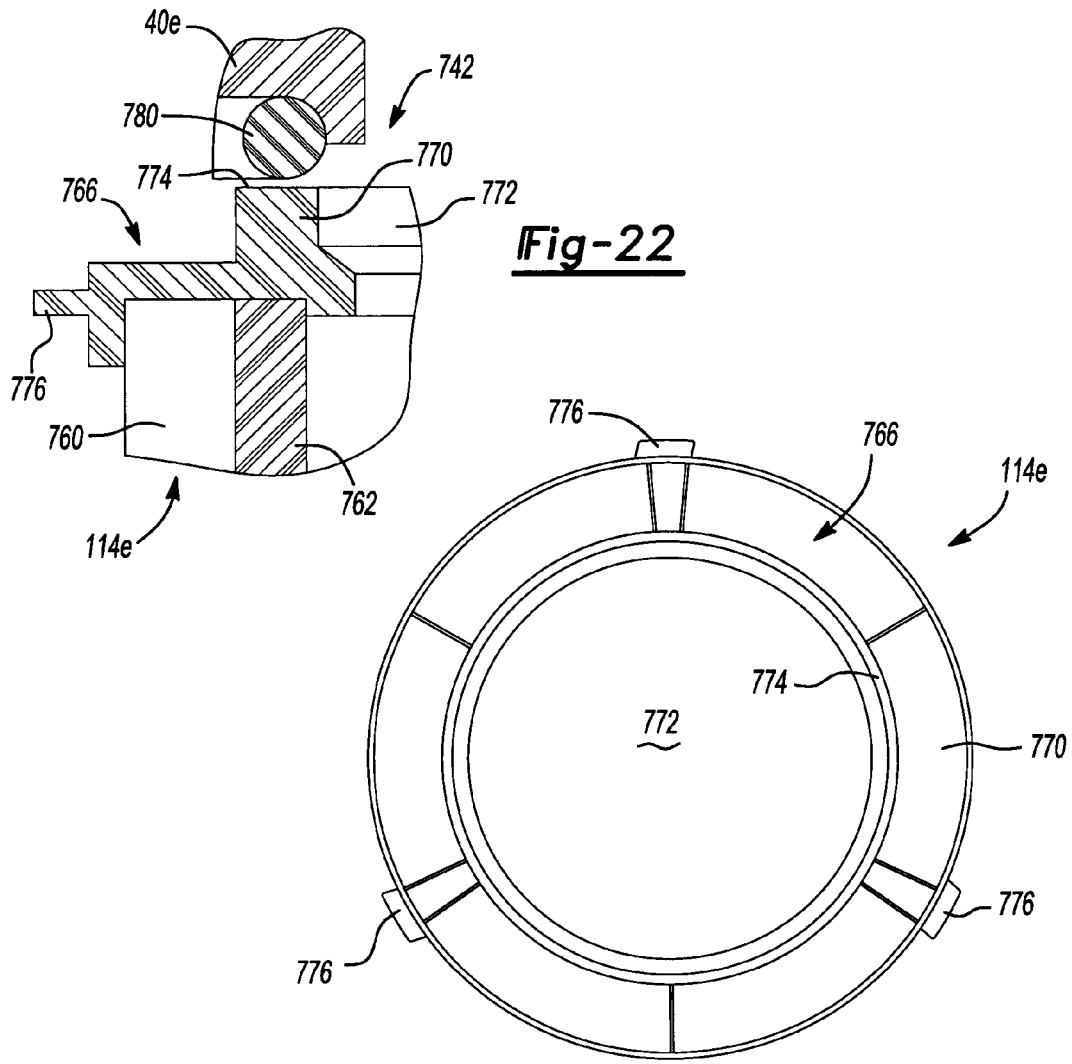
Fig-22
Fig-23
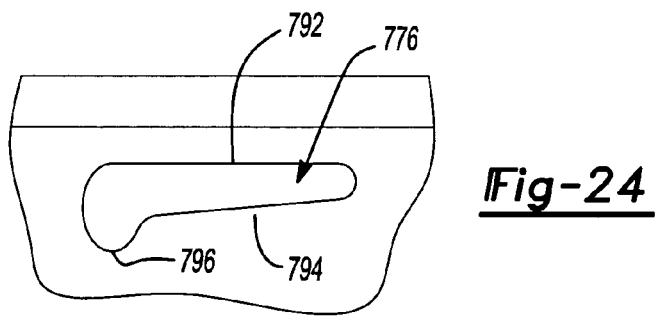
Fig-24

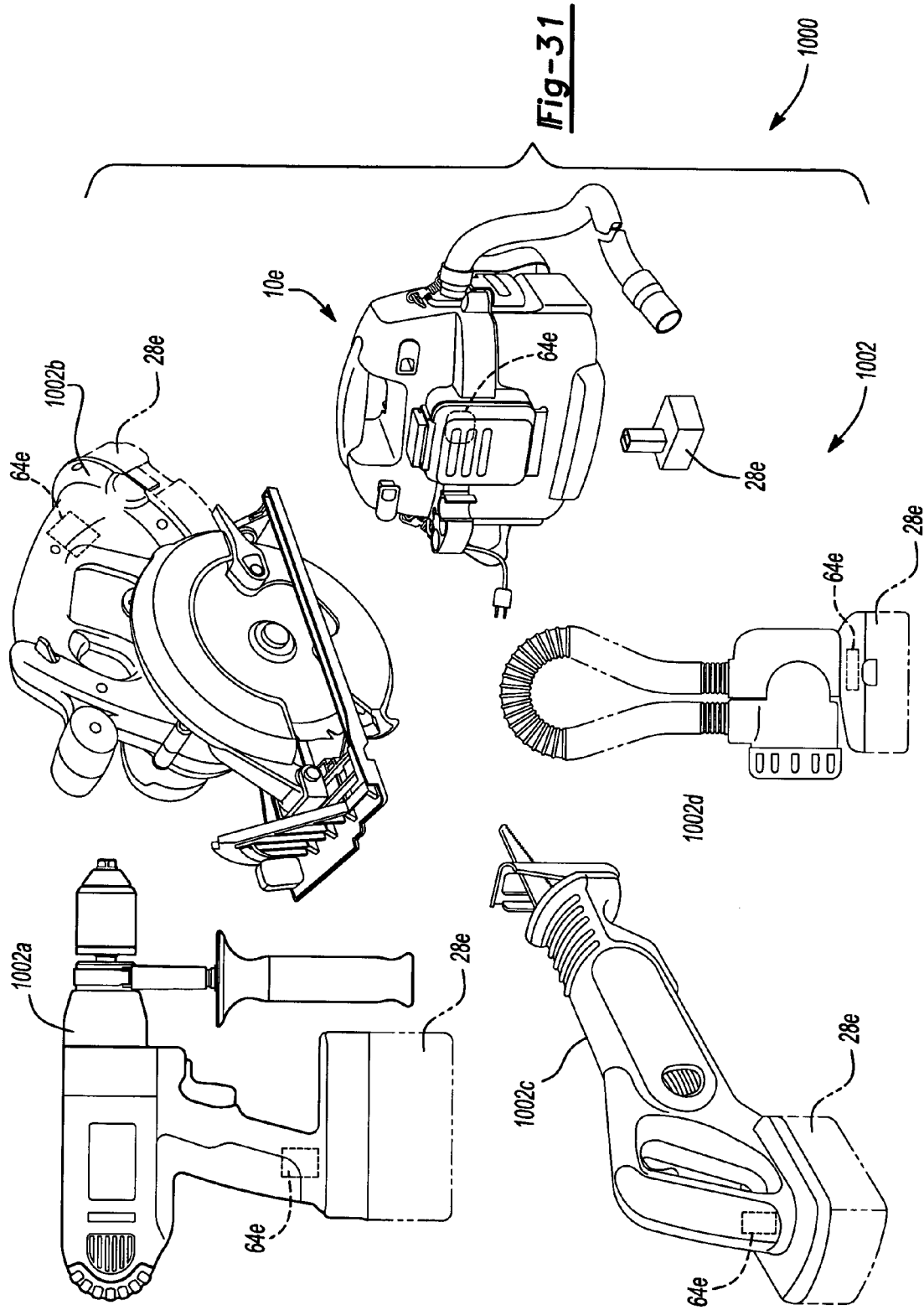

AC/DC HAND PORTABLE WET/DRY VACUUM HAVING IMPROVED PORTABILITY AND CONVENIENCE

FIELD OF THE INVENTION

This application claims the benefit of U.S. Provisional Application No. 60/425,371 filed Nov. 12, 2002.

FIELD OF THE INVENTION

The present invention generally relates to vacuum appliances and more particularly to an AC/DC powered hand-portable wet/dry vacuum having improved convenience and performance.

BACKGROUND OF THE INVENTION

Vacuum appliances that are capable of picking up both wet and dry materials are commonly known as wet/dry vacuums. Such wet/dry vacuums are well known in the art and are commercially available in a variety of sizes and configurations. Recent consumer trends have placed significant cost pressures the commercially available wet/dry vacuums and as such, many manufacturers are presently producing low-end, relatively small capacity low-cost units and/or high-end, relatively high capacity high-cost professional grade units.

The low-end, low-cost units are frequently employed by professional users, such as installers, service technicians and tradespeople in residential construction. These professionals are commonly required to clean their job site prior to leaving for their next job and as such, they frequently prefer the smaller size and portability that are typical of these units. These units, however, are known to have several drawbacks.

One such drawback relates to convenience of the known wet/dry vacuums and in particular the relatively long amount of time that is necessary for their set-up, the frequency with which the hose becomes disconnected during transport or use and the frequency with which the attachments are lost. Due to the relative bulk of the known wet/dry vacuums and their attachments, the professional user frequently makes a dedicated trip to transport the wet/dry vacuum to or from a jobsite.

Another drawback relates to the availability of electrical power on a given jobsite. In new residential construction, it is relatively common to encounter a jobsite where electrical power from an electrical utility is unavailable. In some situations, it may be possible to acquire electrical power from a nearby location (e.g., a neighbor) through long, heavy extension cords. Alternatively, a portable generator is required. The inconvenience of heavy extension cords and the expense and inconvenience of a portable generator is highly undesirable to a professional user, particularly considering that the professional user frequently uses the wet/dry vacuum for less than 10 minutes on a given jobsite.

Yet another drawback concerns the filter system of the known wet/dry vacuums. These filter systems typically employ a disposable filter that is fixedly attached to the lid of the vacuum or some other supporting structure that fits around and covers the fan. When clogged, the disposable filter can severely limit the flow of air through the fan, which significantly impairs the ability of the wet/dry vacuum to pick up debris. Often times, however, a replacement filter is not available to the professional user so that the wet/dry vacuum is simply used at reduced efficiency. Other drawbacks of the known filtering systems include the inconvenience of servicing a filter, which usually entails disassembly of the wet/dry vacuum so as to expose the jobsite to the contents of the canister, and insufficient filtering that results in the discharge of dust from the wet/dry vacuum when the wet/dry vacuum is turned on.

Accordingly, there remains a need in the art for a wet/dry vacuum having improved convenience and performance.

SUMMARY OF THE INVENTION

In one form, the present invention provides a utility vacuum that includes a canister, a powerhead assembly, a shut-off device, an electrical cord, and a battery pack. The powerhead assembly is coupled to the canister and includes a fan, a motor for providing rotary power to the fan, and a power supply for distributing electrical power to the motor. The shut-off device is associated with the powerhead assembly and configured to prevent the fan from drawing a liquid into an inlet of the fan when a volume of the liquid in the canister exceeds a predetermined volume. The electrical cord is associated with the power supply and configured to selectively couple the power supply to a source of alternating current power. The battery is associated with the power supply and provides a source of direct current electrical power for powering the power supply when the power supply is not receiving alternating current power from the source of alternating current power.

In another form, the present invention provides a tool set with a battery pack, a power tool and a utility vacuum. The power tool includes a receptacle assembly for detachably coupling the battery pack to the power tool. The utility vacuum having a canister, a powerhead assembly and a shut-off device. The powerhead assembly is coupled to the canister and has a fan, a motor for providing rotary power to the fan, and a power supply for distributing electrical power to the motor. The shut-off device is associated with the powerhead assembly and configured to prevent the fan from drawing a liquid into the fan inlet when a volume of the liquid in the canister exceeds a predetermined volume. The power supply includes a receptacle assembly for detachably receiving the battery pack. The battery pack may be selectively coupled to either of the power tool and the utility vacuum to provide a source of electrical power thereto.

In another form, the present invention provides a utility vacuum with a canister, a powerhead assembly, a shut-off device and a battery. The powerhead assembly is coupled to the canister and has a fan, a motor for providing rotary power to the fan, and a power supply for distributing electrical power to the motor. The shut-off device is associated with the powerhead assembly and configured to prevent the fan from drawing a liquid into an inlet of the fan when a volume of the liquid in the canister exceeds a predetermined volume. The battery is associated with the power supply and is a source of direct current electrical power for powering the power supply.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 14A is a front elevation view of the wet/dry vacuum of FIG. 14;

FIG. 22 is an enlarged portion of FIG. 15 illustrating the primary filter in greater detail;

FIG. 23 is a top plan view of the primary filter;

FIG. 24 is a side elevation view of a portion of the primary filter illustrating the configuration of the retaining tab in greater detail;

FIG. 31 is a perspective view of a tool set constructed in accordance with the teachings of the present invention.

DETAILED DESCRIPTION OF THE PREFERRED EMBODIMENTS

Figure 1:
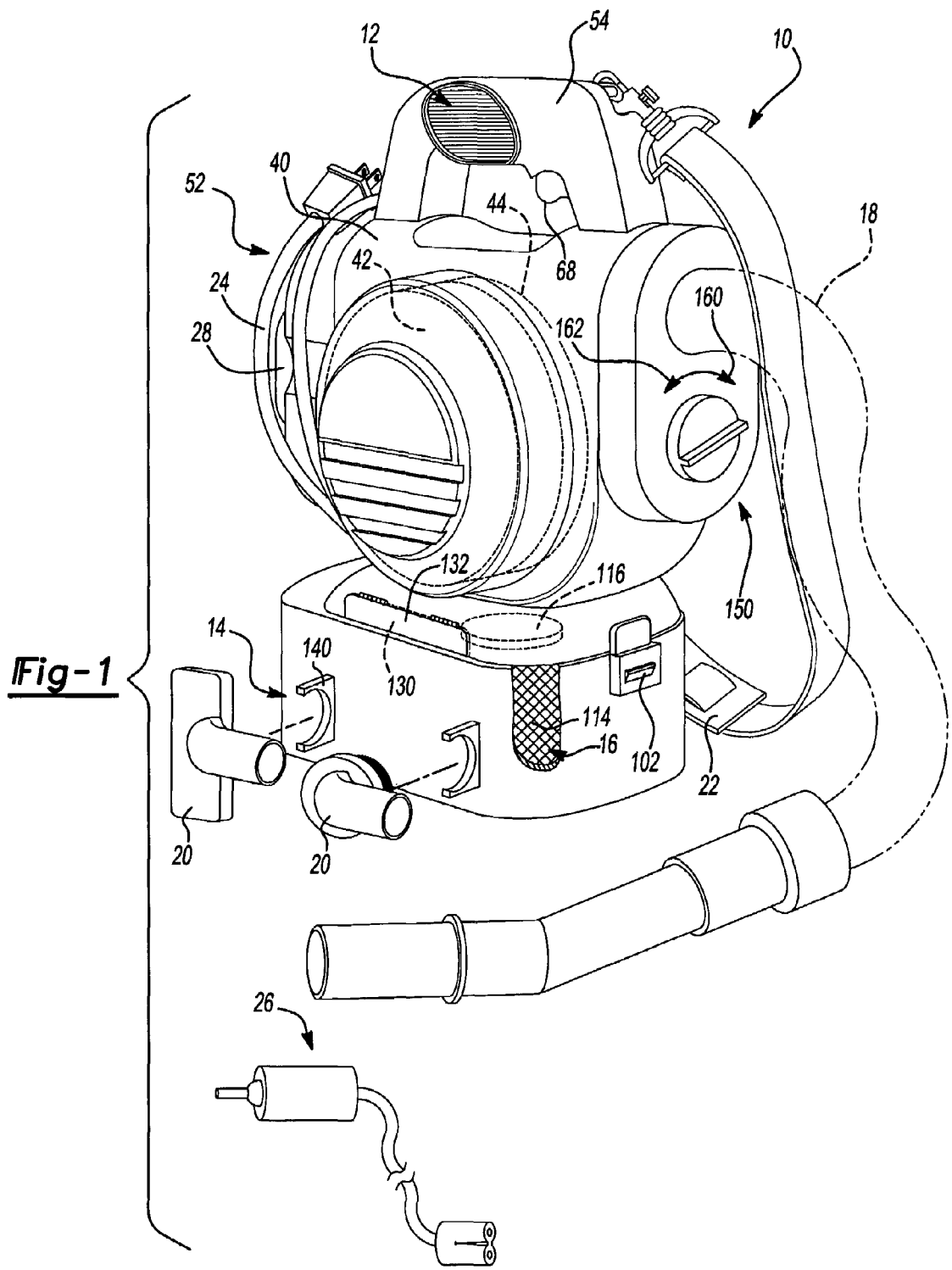
FIG. 1 is a perspective view of a wet/dry utility vacuum constructed in accordance with the teachings of the present invention.

With reference to FIG. 1 of the drawings, a hand-portable wet/dry vacuum constructed in accordance with the teachings of the present invention is generally indicated by reference numeral 10. In the particular example illustrated, the vacuum 10 is shown to include a powerhead assembly 12, a canister assembly 14, a filter system 16, a hose assembly 18, a plurality of conventional hose-end attachments 20, a shoulder strap 22, a first electrical cord 24, a second electrical cord 26 and a battery pack 28.

Figure 2:
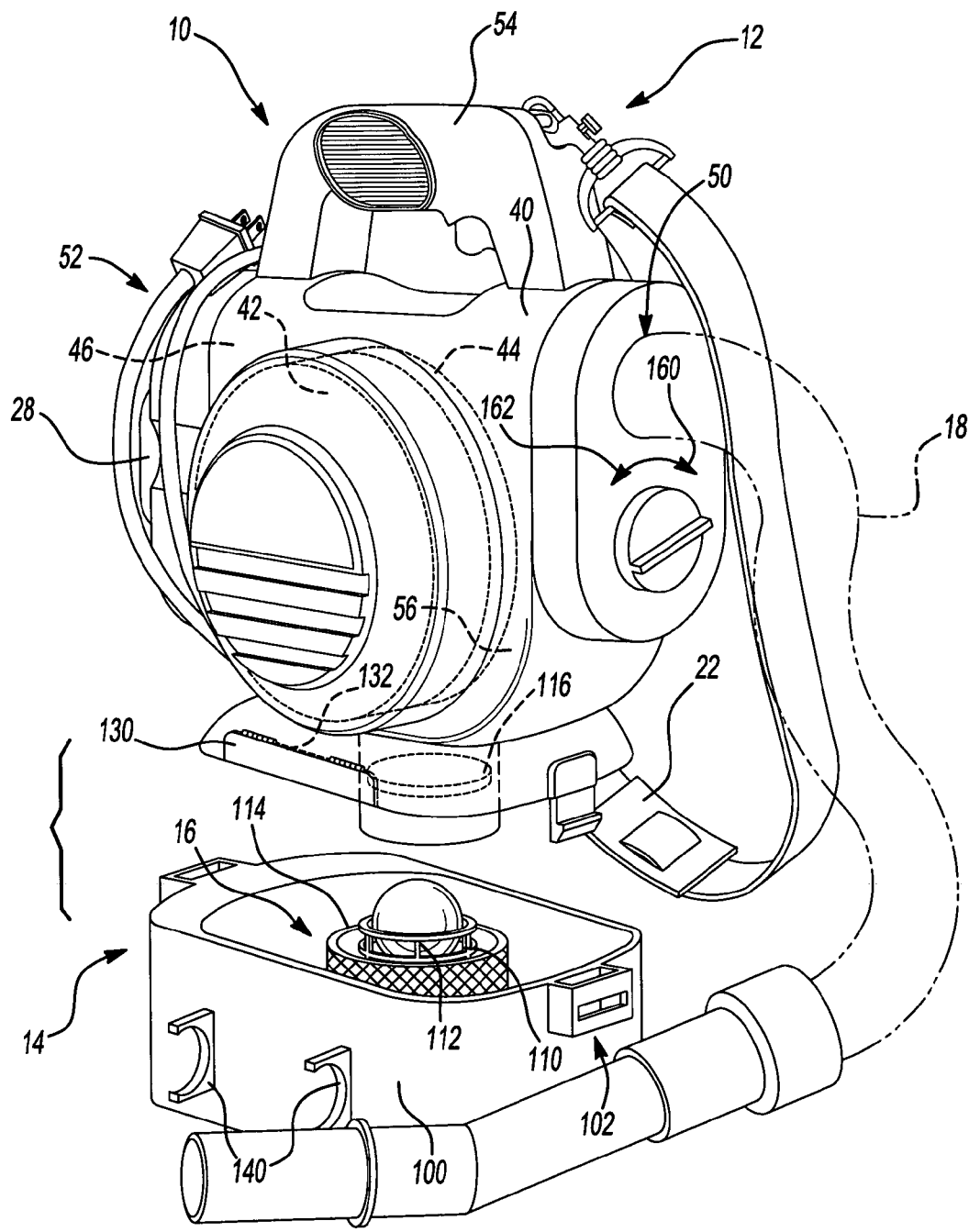
FIG. 2 is an exploded view of the wet/dry vacuum of FIG. 1.

With additional reference to FIG. 2, the powerhead assembly 12 may be removably attached to the canister assembly 14 and includes a housing 40, a motor 42, a fan 44 and a controller 46. The housing 40 defines an inlet port 50, an outlet port 52, a handle 54 and a central cavity 56 into which the motor 42, fan 44 and controller 46 are housed. The inlet port 50 may be routed to the canister assembly 14 on a first side of the filter system 16 while the outlet port 52 may be routed to the canister assembly 14 on a second side of the filter system 16. Air flowing into the inlet port 50 flows into the canister assembly 14 and through the filter system 16 prior to being directed out of the outlet port 52. The motor 42 and the fan 44, which is coupled for rotation with the output shaft (not shown) of the motor 42, cooperate to blow air out of the outlet port 52 to thereby draw air into the powerhead assembly 12 via the inlet port 50.

Figure 3:
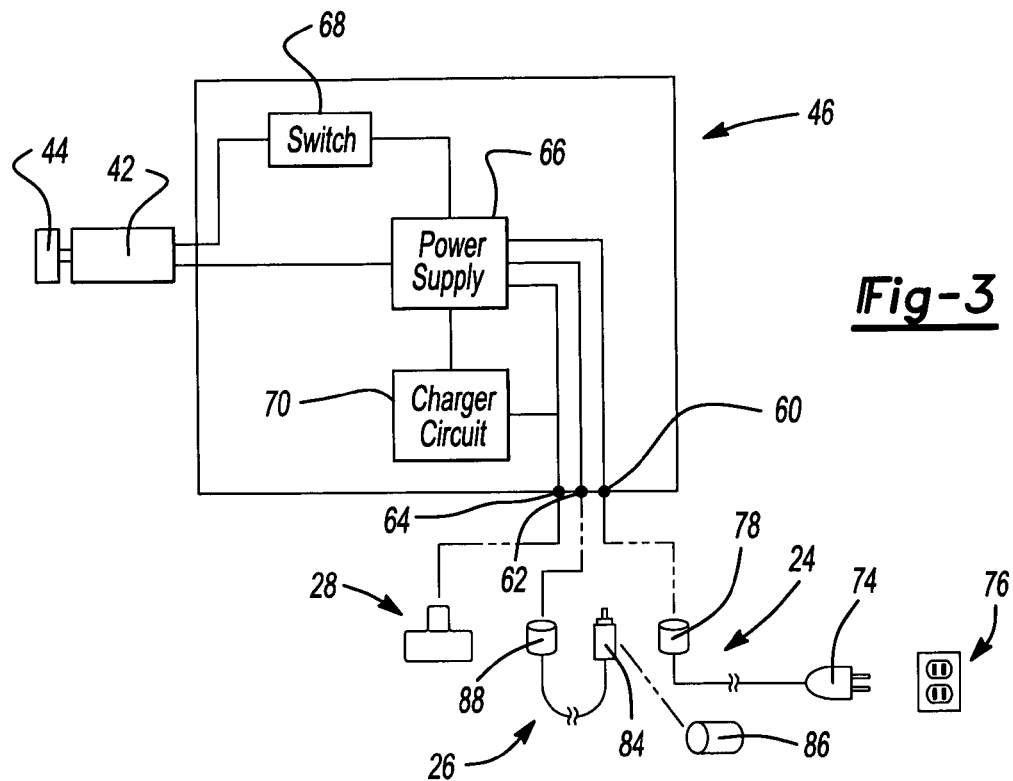
FIG. 3 is a schematic illustration of a portion of the wet/dry vacuum of FIG. 1 illustrating the controller and charging circuit in detail.

In FIG. 3, the controller 46 is illustrated to preferably include a first electrical socket 60, a second electrical socket 62, a receptacle assembly 64, a power supply 66, a power switch 68 and a charger circuit 70. Each of the first and second electrical sockets 60 and 62 and the receptacle assembly 64 are electrically coupled to the power supply 66 and configured to conduct electrical power thereto as will be described in detail, below. The power supply 66 is electrically coupled to the motor 42 and the power switch 68 in a conventional manner to permit the user to selectively enable or disable the flow of electrical power to the motor 42.

The first electrical cord 24 preferrably includes a conventional pronged plug end 74, which is configured to be electrically coupled to a conventional electrical outlet 76, and a conventional first connector-end 78 that is configured to be electrically coupled to the first electrical socket 60. Accordingly, the first electrical cord 24 permits the user of the wet/dry vacuum 10 to couple the power supply 66 to a source of alternating current (AC) power.

The second electrical cord 26 preferably includes a conventional cylindrical plug-end 84, which is configured to be electrically coupled to a conventional cigarette lighter socket 86 of an automotive vehicle, and a conventional second connector-end 88, which is configured to be electrically coupled to the second electrical socket 62. Accordingly, the second electrical cord 26 permits the user to couple the power supply 66 to a source of direct current (DC) power, such as to the electrical system and battery of an automotive vehicle.

Figure 4:
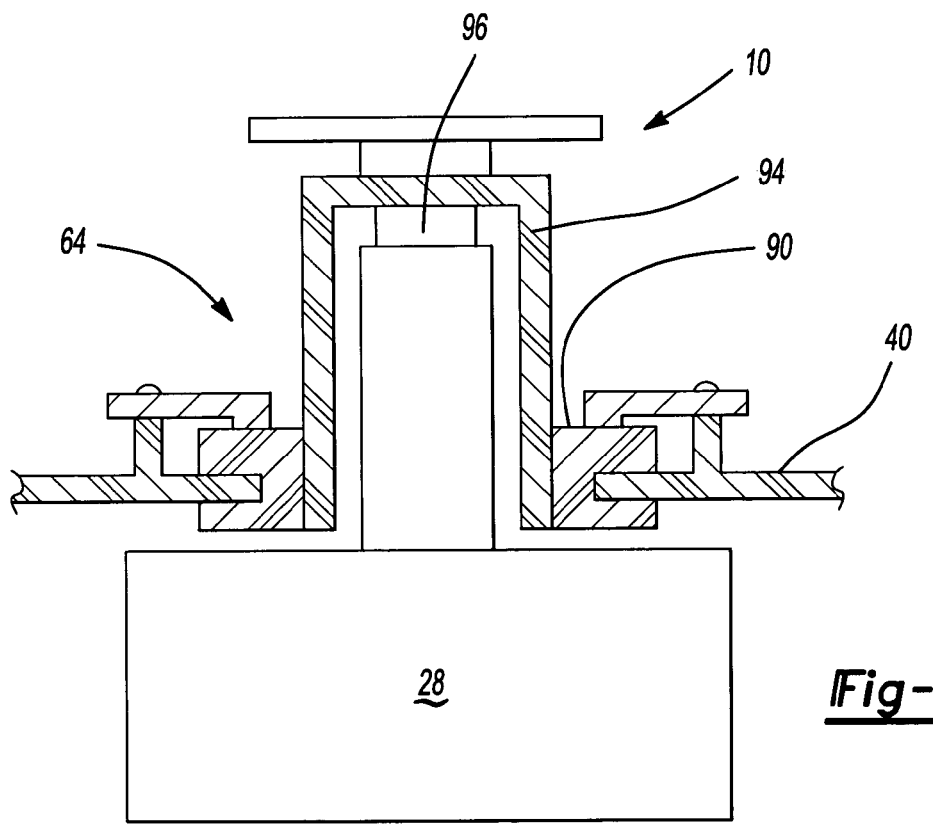
FIG. 4 is a sectional view of a portion of the wet/dry vacuum of FIG. 1 illustrating the receptacle assembly in greater detail.

In the example of FIGS. 3 and 4, the receptacle assembly 64 is illustrated as being flexibly connected to the housing 40 via a flexible gasket 90. Preferably, the gasket 90 is made of a flexible resilient material, such as rubber or another elastomer. The receptacle assembly 64 includes a receptacle housing 94, which is configured to receive the battery pack 28, and a connector 96 that is floatingly disposed in the receptacle housing 94 to minimize the shock received by a battery pack 28 if the wet/dry vacuum 10 is dropped. The connector 96 has a plurality of terminals (not shown) with a configuration that contacts the associated terminals (not shown) of the battery pack 28. Preferably, the battery pack 28, terminals, receptacle housing 94 and connector 96 are configured in the manner disclosed in U.S. Pat. No. 5,144,217, the disclosure of which is hereby incorporated by reference as if fully set forth herein. Accordingly, the receptacle assembly 64 permits the user to couple the power supply 66 to the battery pack 28 so that the wet/dry vacuum 10 may be operated without either of the first and second electrical cords 24 and 26 being coupled thereto, as when, for example, a source of AC or DC electrical power is unavailable or inconvenient to access. Also preferably, the power supply 66 is compatible with battery packs having various different voltages (e.g., 18v, 14v, 12v, and/or 9.6v) in a manner that is well known in the art. Those skilled in the art will appreciate that any manual or automatic means may be employed to select the source of power for the wet/dry vacuum 10. For example, a conventional rotary switch may be provided to permit the user to manually select between AC power, DC power (from the second power cord 26) and a battery pack 28. Alternatively, an automatic switch (comprising transistors or any other suitable electrical device) may be employed such that the power supply 66 will "look" for one power type, such as AC power, first, and should it not be available, look for "DC" power from the second power cord 26 next and thereafter from the battery pack 28.

In FIG. 3, the charger circuit 70 is coupled to the power supply 66 and the receptacle assembly 64 in a manner that is well known in the art. The charger circuit 70 allows for the charging of battery packs having different voltages, as is well known in the art. An example of a suitable charger circuit is disclosed in U.S. Pat. No. 6,427,070, the disclosure of which is incorporated by reference as if fully set forth herein.

Accordingly, a user can charge a battery pack 28, when the motor 42 is not running, by placing the battery pack 28 in the receptacle assembly 64 such that the terminals of the connector 96 electrically engage the associated terminals of the battery pack 28 and providing the wet/dry vacuum 10 with another source of electrical power via one of the first and second electrical cords 24 and 26. Once charged, the battery pack 28 may then be removed from the receptacle assembly 64 and employed to power another device, such as the heavy-duty audio equipment of U.S. Pat. No. 6,427,070 or the cordless drill/driver of U.S. Pat. No. 6,431,289.

Returning to FIG. 2, the canister assembly 14 preferably includes a canister 100 and a latching system 102 that releasably secures the canister 100 to the powerhead assembly 12. The particular canister illustrated has a capacity of about two gallons, but those skilled in the art will appreciate that the canister 100 may in the alternative have a capacity that is larger or smaller.

The filter system 16 may be completely attached to the powerhead assembly 12 but in the particular example provided, is carried canister 100 and includes a plenum 110 that is releasably attachable to the powerhead assembly 12, a float ball 112, a primary filter 114 and a secondary filter 116. The plenum 110 may have a hollow, cage-like construction that permits air to flow therethrough. The plenum 110 serves to retain and support the primary filter 114 as well as retain and guide the float ball 112 in a generally vertical orientation. The float ball 112 rises automatically within the plenum 110 to close off the filter system 16 from the fan 44 (which cuts off the flow of air through the powerhead assembly 12) when liquid in the canister 100 reaches a predetermined level.

The primary filter 114 may include a filter structure (not specifically shown), which is formed from a rigid plastic material, and a fabric filter material (not specifically shown) that completely surrounds at least side of the filter structure. The fabric filter material is preferably formed of a washable filter material so as to permit the primary filter 114 to be washed when loaded with dust or dirt, rather than disposed of and replaced. As those skilled in the art will appreciate, however, the primary filter 114 may be made of any suitable filtering material, including an open-cell foam or a conventional filter paper (in which case the primary filter 114 would be disposable). Optionally, a pre-filter structure (not shown) may also be employed. Suitable pre-filter structures include wire mesh or plastic screens, or open-cell foam which serve to collect dust and dirt (e.g., drywall dust) before the dust-carrying airflow contacts the primary filter 114.

The secondary filter 116, which is optional and in the particular example provided carried by the powerhead assembly 12, is disposed upstream of the primary filter 114 and is of a generally finer mesh or porosity so as to collect relatively small dust particles before they are expelled through the outlet port 52. The secondary filter 116 is preferably removable from the filter system 16 without disassembling the canister assembly from the powerhead assembly 12. In the example provided, an access port 130 is formed in the housing 40 between the primary filter 114 and the fan 44. When the secondary filter 116 is received into the access port 130, a gasketed door 132 that may be hingedly coupled to the housing 40 is closed to seal the access port 130 and ensure that air flowing to the fan 44 encounters the primary filter 114 and then the secondary filter 116. The purpose of the secondary filter 116 is to provide very fine filtering of the air passing through the wet/dry vacuum 10 so that dirt and dust are not expelled from the outlet port 52 when the wet/dry vacuum 10 is operated. Preferably, the wet/dry vacuum 10 may also be used without the secondary filter 116 when the expelling of relatively fine dust from the outlet port 52 is not an issue.

With reference to FIGS. 1 and 2, the hose assembly 18 is preferably a flexible vacuum hose which is fixedly coupled to the inlet port 50. Also preferably, the hose assembly 18 is at least partially retractable into the inlet port 50 so as to provide a convenient means for storage of the hose assembly 18. Alternatively, the hose assembly 18 may be removably friction fitted on a selective basis to the inlet port 50 (for vacuuming) or the outlet port 52 (for blowing).

The distal end of the hose assembly 18 may be friction-fittable to any of the hose-end attachments 20. Such hose-end attachments 20 are well known in the art and as such, a detailed discussion of their construction and use need not be provided herein. To prevent the hose-end attachments 20 from being lost, a plurality of receiving slots 140 may be formed into the housing 40 and/or canister 100. The receiving slots 140 may be constructed to frictionally engage an associated one of the hose-end attachments 20. When not in use, each hose-end attachment 20 may be coupled to the housing 40 and/or canister 100 via its associated receiving slot 140.

The shoulder strap 22, which is optional, is coupled to the powerhead assembly 12 and permits the user of the wet/dry vacuum 10 to wear the unit over their shoulder so that their hands may be used for other tasks, including transporting other equipment or manipulating the hose assembly 18 when the wet/dry vacuum 10 is in use. In the particular embodiment illustrated, the shoulder strap 22 is coupled to the handle 54, which is integrally formed with the housing 40.

Figure 5:
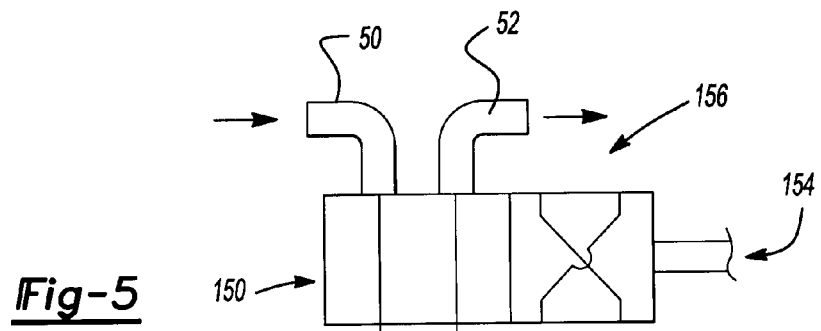
FIG. 5 is a schematic view of the wet/dry vacuum of FIG. 1 illustrating the flow path when the wet/dry vacuum is used in the vacuuming mode.
Figure 6:
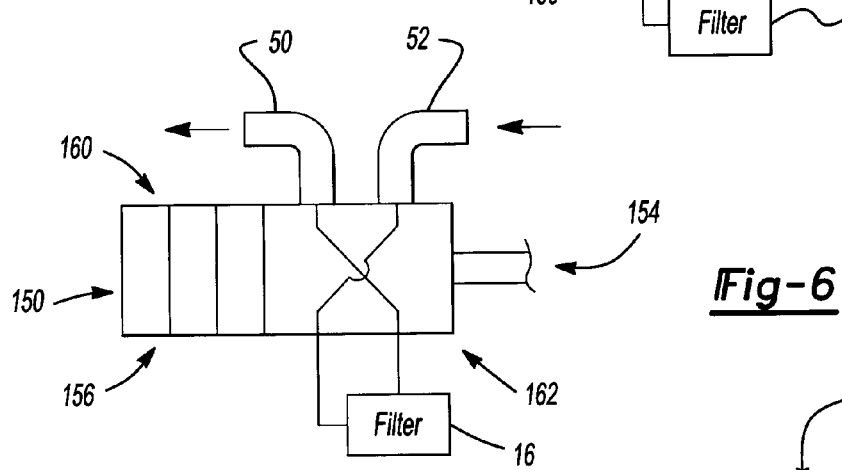
FIG. 6 is a schematic view of the wet/dry vacuum of FIG. 1 illustrating the flow path when the wet/dry vacuum is used in the blowing mode.

As noted above, the hose assembly 18 is preferably fixedly coupled to the inlet port 50 and as such, is not connectable to the outlet port 52 so that the wet/dry vacuum 10 can be used as a blower in a conventional manner (i.e., by connecting the hose assembly 18 to the outlet port 52). As best shown in FIGS. 1, 5 and 6, the wet/dry vacuum 10 may include a valve assembly 150 that selectively controls the flow of air to the fan 44. More specifically, the valve assembly 150 may be a two-position four-way valve that includes an actuator 154 and a valve element 156. In the particular embodiment illustrated, the actuator 154 is a rotary style actuator that is movable between a first setting 160 and a second setting 162. The valve element 156 is coupled for rotation with the actuator 154 such that when the actuator 154 is positioned in the first setting 160, air is drawn from the inlet port 50 through the filter system 16 and into the fan 44 in the manner described above. When the actuator 154 is positioned in the second setting 162, the valve element 156 moves (e.g., rotates in the example provided) to cause the outlet port 52 to be in fluid communication with the inlet side of the filter system 16 and the inlet port 50 to be in fluid communication with the discharge side of the fan 44.

As those skilled in the art will appreciate, various components of the wet/dry vacuum 10, such as the motor 42, the fan 44 and the primary filter 114, may be constructed and/or arranged in a manner that is well known in the art. Such components, constructions and arrangements are illustrated and discussed, for example, in U.S. Pat. No. 6,363,574, which is hereby incorporated by reference as if fully set forth herein.

Figure 7:
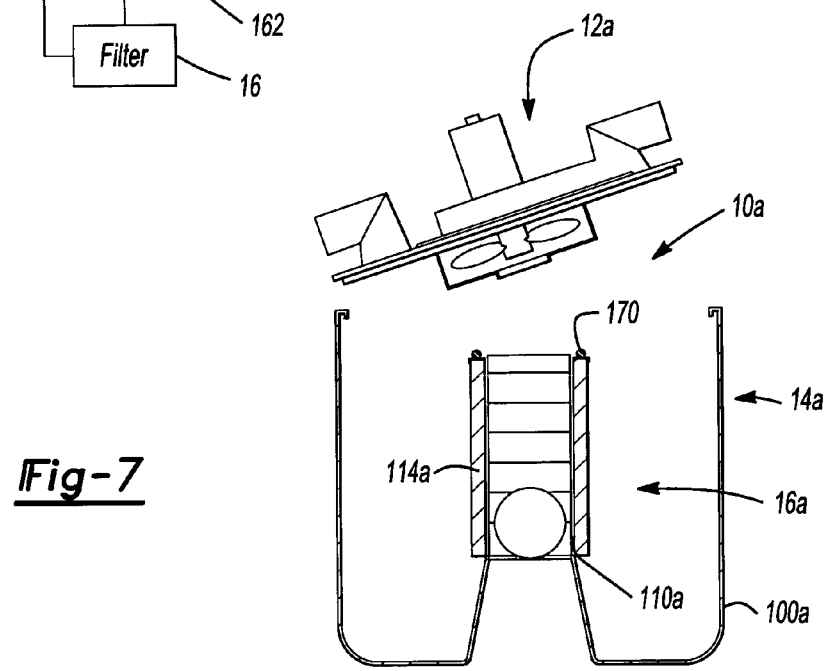
FIG. 7 is a sectional view of a second wet/dry vacuum constructed in accordance with the teachings of the present invention.

With reference to FIG. 7, a second wet/dry vacuum constructed in accordance with the teachings of the present invention is generally indicated by reference numeral 10a. Although schematically illustrated, the wet/dry vacuum 10a is generally similar to the wet/dry vacuum 10 of FIG. 1 except that the filter system 16a is integrated with the canister assembly 14a. More specifically, the plenum 110a is coupled to the canister 100a and the primary filter 114a completely shrouds the plenum 110a. When the powerhead assembly 12a is coupled to the canister assembly 14a, a gasket 170 is compressed between the primary filter 114a and the powerhead assembly 12a to thereby sealingly engage the primary filter 114a to the powerhead assembly 12a.

When the canister 100a is to be emptied, the powerhead assembly 12a is unlatched from the canister 100a, the primary filter 114a is removed from the canister 100a and the canister 100a may be overturned to empty its contents. Like the primary filter 114, the primary filter 114a is preferably at least partially constructed from a washable and re-usable filtering material to thereby eliminate the need for replacement filters. This configuration is advantageous in that all of the dirty components are located together and remain in an upright condition when they are being removed. In contrast to the known wet/dry vacuums wherein the filter system is coupled to the powerhead, dust and other debris remain contained within the canister 100a when the powerhead assembly 12a is removed. Furthermore, removal and/or replacement of the primary filter 114a is quick and efficient, as no fasteners are employed to fix the position of the primary filter 114a relative to the powerhead assembly 12a.

Figure 8:
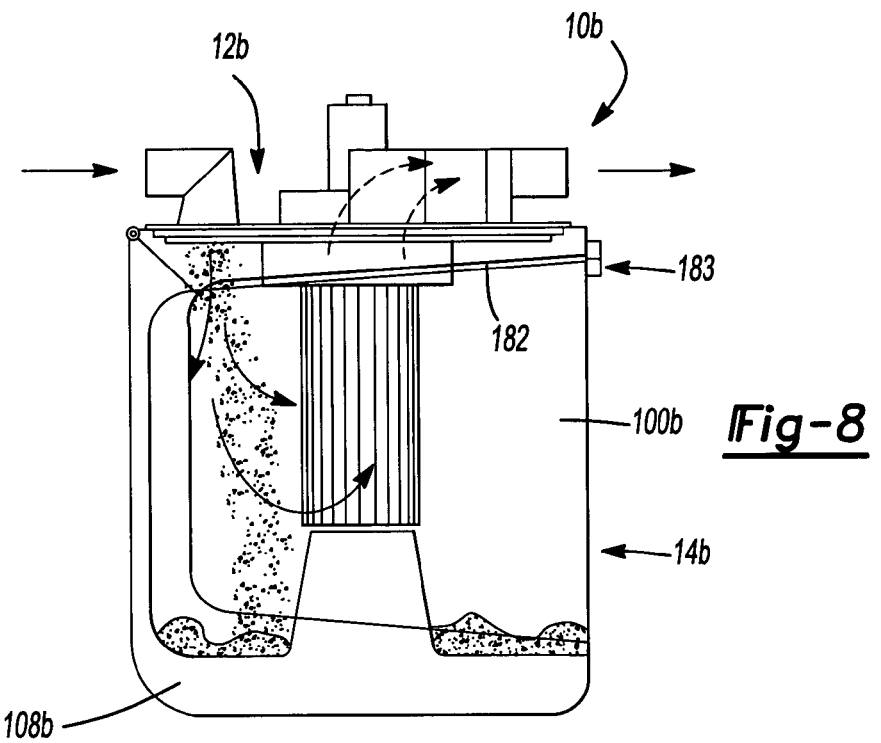
FIG. 8 is a sectional view of a third wet/dry vacuum constructed in accordance with the teachings of the present invention.
Figure 9:
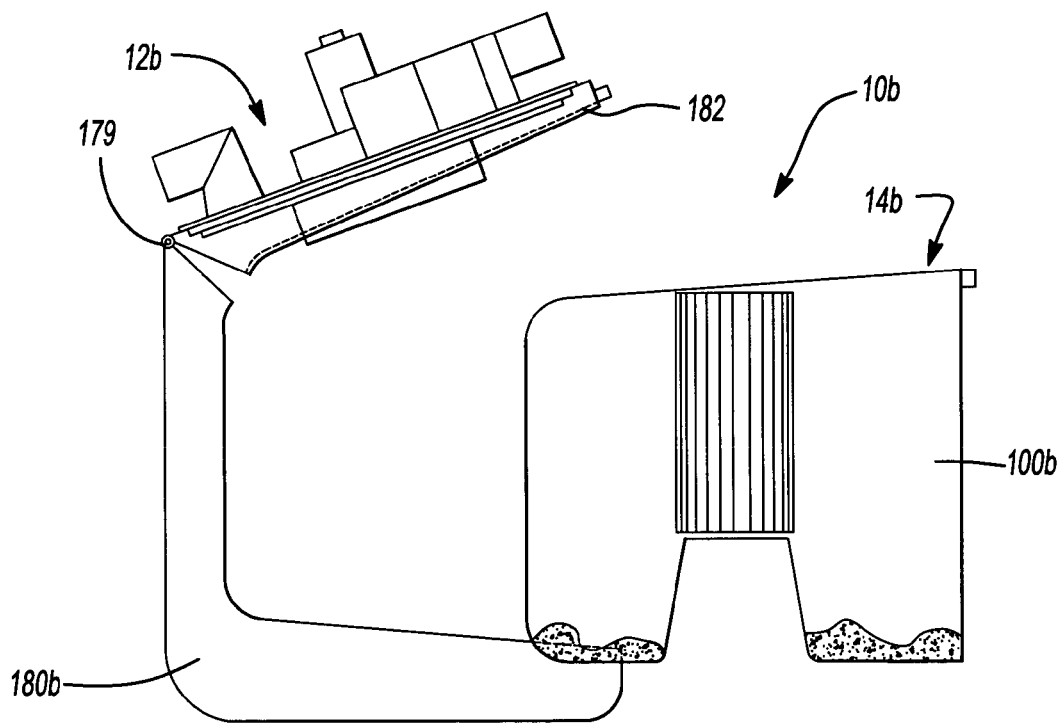
FIG. 9 is a sectional view similar to FIG. 8 but illustrating the powerhead assembly in a raised condition and the canister assembly removed from the housing.

With reference to FIGS. 8 and 9, another wet/dry vacuum constructed in accordance with the teachings of the present invention is generally indicated by reference numeral 10b. Although schematically illustrated, the wet/dry vacuum 10b is generally similar to the wet/dry vacuum 10a of FIG. 7 except that the powerhead assembly 12b is pivotally (via a hinge 179, for example) attached to a housing 180 that houses the canister assembly 14b.

When the canister assembly 14b is to be removed from or inserted into the housing 180, the powerhead assembly 12b is pivoted upwardly as shown in FIG. 9. Once the canister assembly 14b is seated within the housing 180, the powerhead assembly 12b is pivoted downwardly so that a gasket 182 that is carried by the powerhead assembly 12b sealingly engages the canister 100b. Those skilled in the art will appreciate that the gasket 182 may alternatively be carried by the canister 100b. A conventional latch mechanism 183 may be employed to secure the powerhead assembly 12b to the canister assembly 14b.

Figure 10:
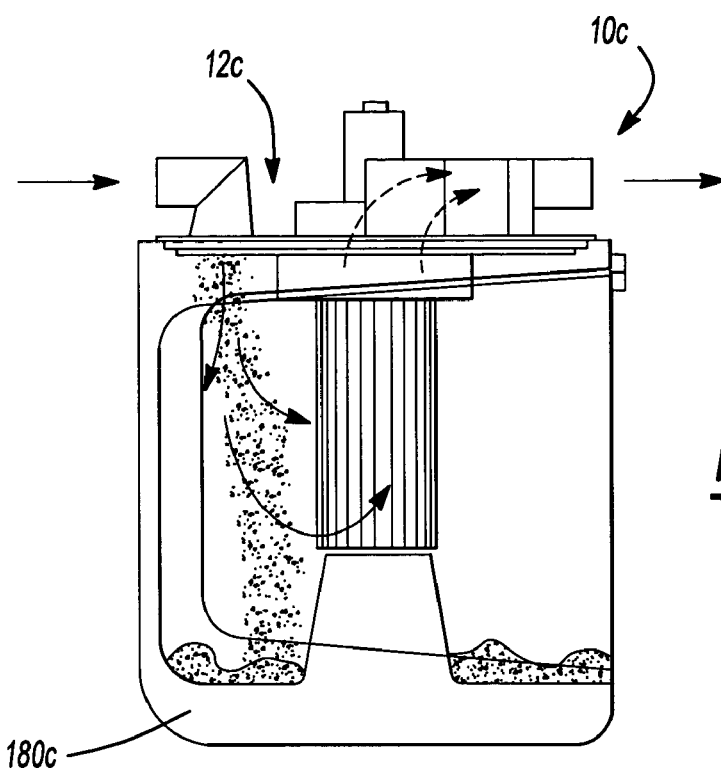
FIG. 10 is a sectional view of a fourth wet/dry vacuum constructed in accordance with the teachings of the present invention.
Figure 11:
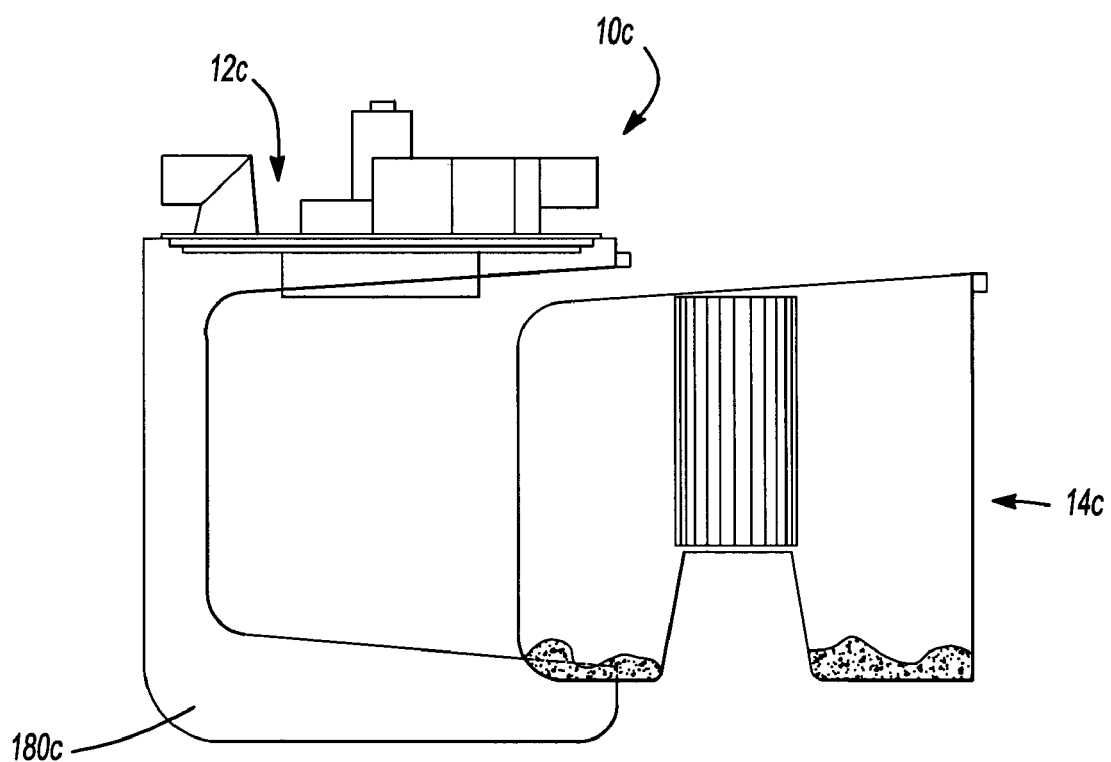
FIG. 11 is a sectional view similar to FIG. 10 but illustrating the canister assembly removed from the housing.

With reference to FIGS. 10 and 11, a fourth wet/dry vacuum constructed in accordance with the teachings of the present invention is generally indicated by reference numeral 10c. Although schematically illustrated, the wet/dry vacuum 10c is generally similar to the wet/dry vacuum 10b of FIGS. 8 and 9 except that the powerhead assembly 12c is fixedly attached attached to the housing 180c that houses the canister assembly 14c. The canister assembly 14c is therefore inserted to and removed from the housing 180c by sliding the canister assembly 14c into or out of the housing 180c.

Figure 12:
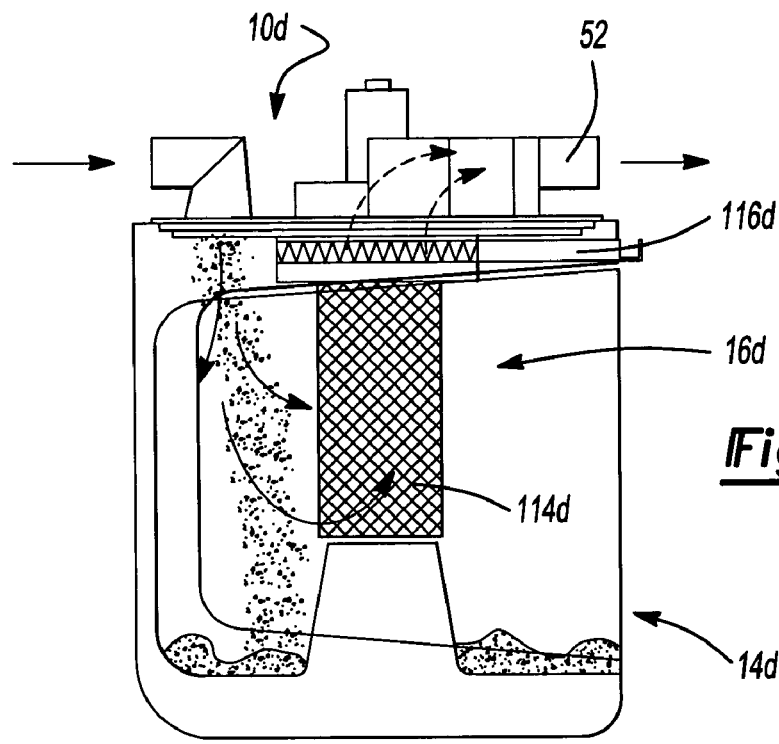
FIG. 12 is a sectional view of a fifth wet/dry vacuum constructed in accordance with the teachings of the present invention.
Figure 13:
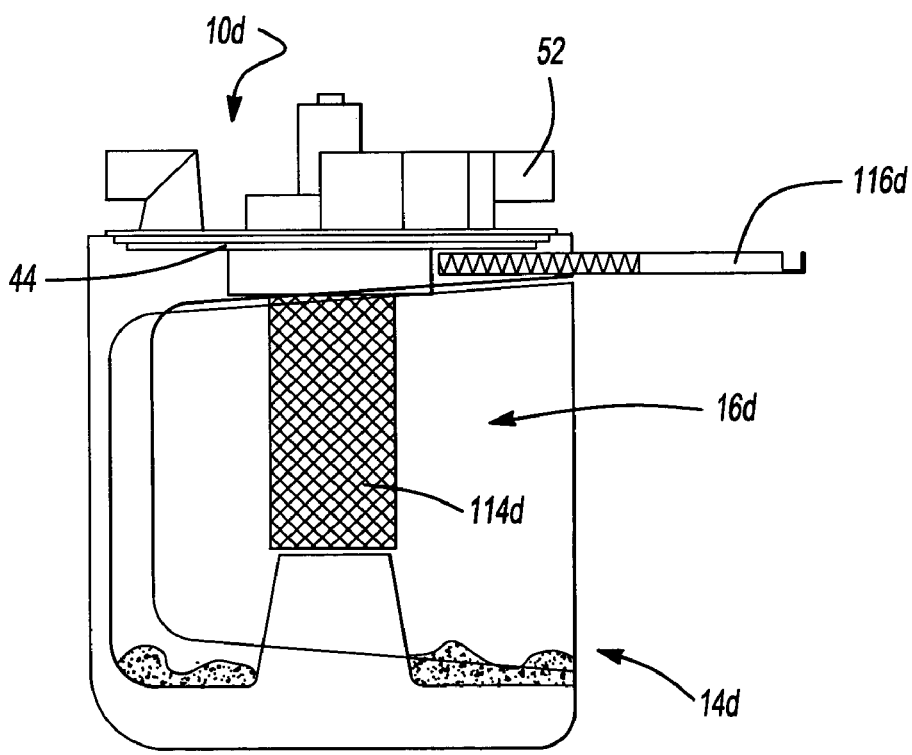
FIG. 13 is a sectional view similar to FIG. 12 but illustrating the secondary filter in a removed condition.

With reference to FIGS. 12 and 13, yet another wet/dry vacuum constructed in accordance with the teachings of the present invention is generally indicated by reference numeral 10d. The wet/dry vacuum 10d is generally similar to the wet/dry vacuum 10c of FIGS. 10 and 11, except that a secondary filter 116d is incorporated into the filter system 16d. Like the secondary filter 116 shown in FIG. 5, the secondary filter 116d may be located between the fan 44 and the primary filter 114d and is relatively finer in porosity/mesh so that dirt and dust are not expelled from the outlet port 52 when the wet/dry vacuum 10d is operated. Advantageously, the secondary filter 116d may be removed and cleaned or replaced without removal of the canister assembly 14d.

Figure 14:
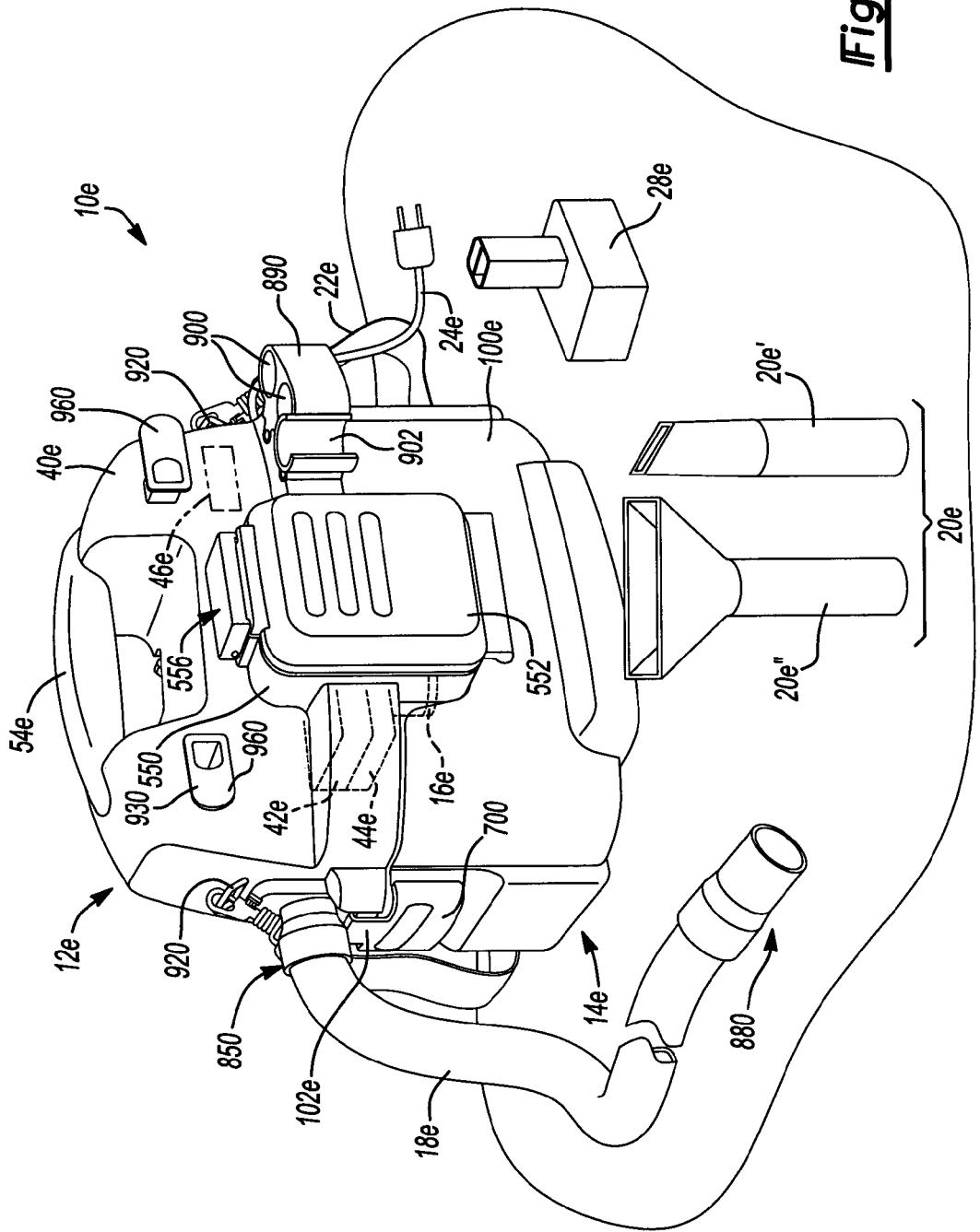
FIG. 14 is a perspective view of a sixth wet/dry vacuum constructed in accordance with the teachings of the present invention.

With reference to FIG. 14, a sixth vacuum constructed in accordance with the teachings of the present invention is generally indicated by reference numeral 10e. The vacuum 10e is shown to preferably include a powerhead assembly 12e, a canister assembly 14e, a filter system 16e, a hose assembly 18e, a plurality of conventional hose-end attachments 20e, a shoulder strap 22e, an electrical cord 24e and a battery pack 28e.

Figure 15:
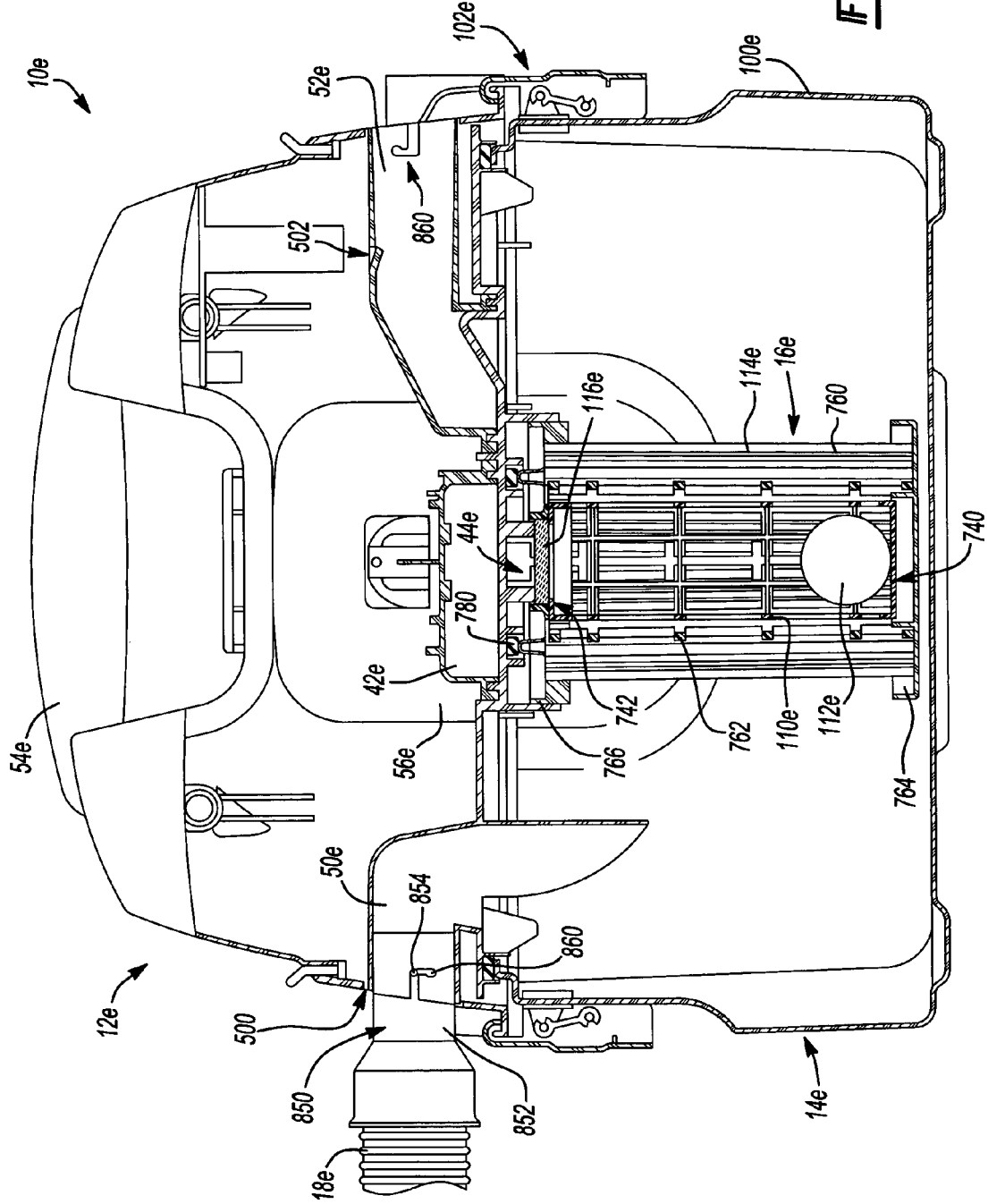
FIG. 15 is a longitudinal section view of the wet/dry vacuum of FIG. 14.

With additional reference to FIG. 15, the powerhead assembly 12e may be removably attached to the canister assembly 14e and may include a housing 40e, a motor 42e, a fan 44e and a controller 46e. The housing 40e may define one or more of an inlet port 50e, an outlet port 52e, a handle 54e and a central cavity 56e into which the motor 42e, fan 44e and controller 46e may be housed. The inlet port 50e is routed into the canister assembly 14e on a first side of the filter system 16e while the outlet port 52e routes air out of the powerhead assembly 12e on a second side of the filter system 16e. Air flowing into the inlet port 50e may flow into the canister assembly 14e and through the filter system 16e prior to being directed out of the outlet port 52e. The motor 42e and the fan 44e, which is coupled for rotation with the output shaft (not shown) of the motor 42e, cooperate to preferably blow air out of the outlet port 52e which thereby draws air into the canister assembly 14e via the inlet port 50e.

In the example provided, the housing 40e may be configured to aid in the cooling of the motor 42e during its operation. More specifically, the housing 40e may be configured with one or more cooling inlet apertures 500 and one or more cooling outlet apertures 502, with both of the cooling inlet and outlet apertures 500 and 502 being in fluid communication with the central cavity 56e as will be described in greater detail, below. In the embodiment provided, a single cooling inlet aperture 500 and a single cooling outlet aperture 502 are employed. With additional reference to FIGS. 16 and 17, the cooling inlet aperture 500 is illustrated as being concentrically disposed about the inlet port 50e to thereby disguise its location on the housing 40e, but those skilled in the art will appreciate that the cooling inlet aperture(s) 500 may be located at various other locations on the housing 40e. The cooling outlet aperture 502 may be located in the portion of the housing 40e that defines the outlet port 52e. In the example provided, the cooling outlet aperture 502 extends through a trailing portion 510 of a protrusion 512 that is formed on the wall 514 of the outlet port 52e and oriented in a direction such that a longitudinal axis of the protrusion 512 is generally parallel to the flow of air through the outlet port 52e.

The particular vacuum 10e provided is configured such that during its operation, air flows through the outlet port 52e to create a zone 520 of relatively low static pressure proximate the cooling outlet aperture 502, causing air to flow from the central cavity 56e through the cooling outlet aperture 502 where it merges with the air flowing through the outlet port 52e. The air departing from the central cavity 56e likewise draws fresh air into the central cavity 56e through the cooling inlet aperture 500. The exchange of air in the central cavity 56e permits the motor 42e to reject relatively higher levels of heat. More specifically, the air flowing through the central cavity 56e provides an air stream permits that flows against the motor 42e to thereby permit the motor 42e to reject heat therefrom with a convective heat transfer mechanism.

Figure 18:
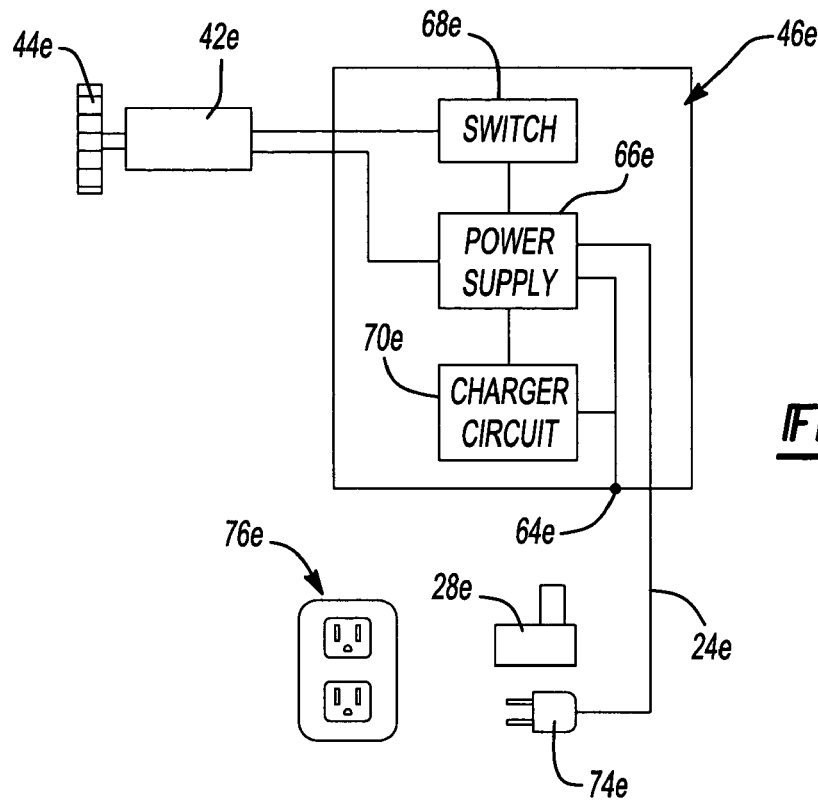
FIG. 18 is a schematic view of a portion of the wet/dry vacuum of FIG. 14 illustrating the controller in greater detail.

In FIG. 18, the controller 46e is illustrated to preferably include a receptacle assembly 64e, a power supply 66e, a power switch 68e and an optional charger circuit 70e. The receptacle assembly 64e is electrically coupled to the power supply 66e and configured to conduct electrical power thereto as will be described in detail, below. The power supply 66e is electrically coupled to the motor 42e and the power switch 68e to permit the user to selectively enable or disable the flow of electrical power to the motor 42e.

The electrical cord 24e may include a conventional pronged plug end 74e, which is configured to be electrically coupled to a conventional electrical outlet 76e, and an opposite end (not shown) which is electrically coupled in a conventional manner to the power supply 66e. Accordingly, the electrical cord 24e may permit the user of the wet/dry vacuum 10e to couple the power supply 66e to a source of alternating current (AC) power.

Figure 19:
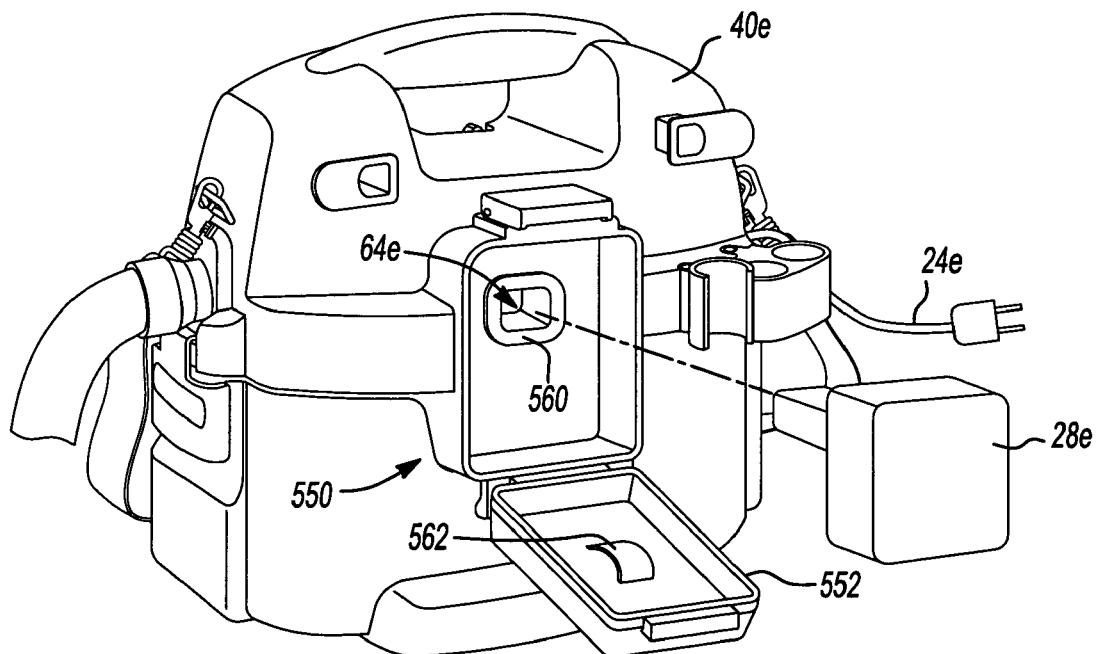
FIG. 19 is a perspective view of the wet/dry vacuum of FIG. 14 illustrating the lid in a lowered condition and the battery pack exploded from the battery pack enclosure.

The receptacle assembly 64e may be generally similar to the receptacle assembly 64 of FIGS. 3 and 4 and as such, need not be discussed in significant detail. In the example provided, the receptacle assembly 64e is illustrated in FIG. 19 to be disposed in a battery enclosure 550 that is coupled to or integrally formed with the housing 40e. A lid 552 may be hingedly coupled to the battery enclosure 550 and is movable between a closed position (FIG. 14), which substantially closes the battery enclosure 550, and an open position, which substantially clears the battery enclosure 550. An over-center camming latch mechanism 556 may be employed to selectively maintain the lid 552 in the closed position. An optional battery pack gasket 560 and leaf spring 562 may also be employed. The battery pack gasket 560 may be disposed between the battery pack 28e and one or both of the receptacle assembly 64e and the battery enclosure 550 (i.e., battery pack gaskets 560 in the latter example), while the leaf spring 562 may be attached to the lid 552 and positioned so as to push the battery pack 28e into electrical contact with the receptacle assembly 64e and sealing contact with the battery pack gasket 560 when the lid 552 is positioned in the closed position. The battery pack gasket 560 inhibits liquids from entering the receptacle assembly 64e and the interior of the housing 40e despite the presence of vent apertures 564 (FIG. 25) that extend through the battery enclosure 550 and/or lid 552.

Figure 20:
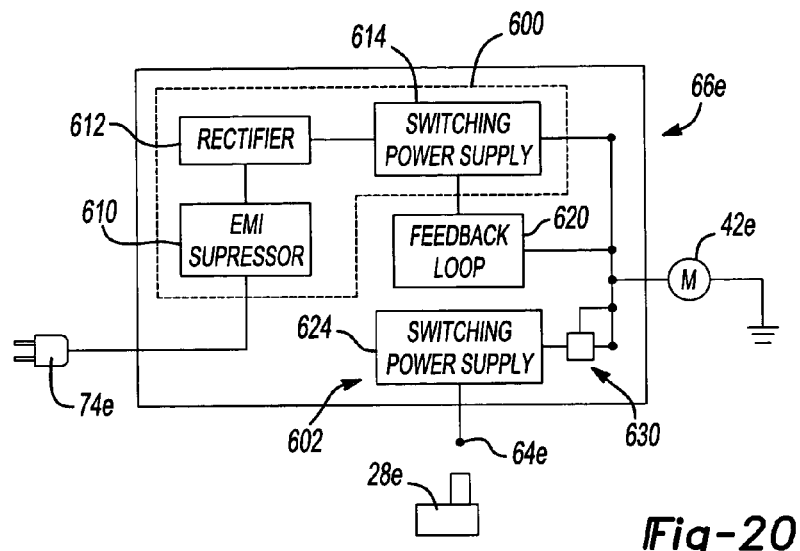
FIG. 20 is a schematic view of a portion of the wet/dry vacuum of 14 illustrating the power supply in greater detail.

The receptacle assembly 64e permits the user to couple the power supply 66e to the battery pack 28e so that the wet/dry vacuum 10e may be operated when, for example, a source of AC electrical power is unavailable or inconvenient to access. Also preferably, the power supply 66e is compatible with battery packs having various different voltages (e.g., 18v, 14v, 12v, and/or 9.6v). Stated another way, the power supply 66e is preferably configured such that a first battery pack having a first output voltage and a second battery pack having a second output voltage that is different than the first output voltage may be used interchangeably to power the power supply 66e. In the particular example provided, the power supply 66e includes an AC/DC converter 600 and a DC/DC converter 602 as shown in FIG. 20. The AC/DC converter 600 preferably has an electromagnetic interference suppression module 610, a rectifier 612 for rectifying alternating current power input thereto from the electrical cord 24e, and a switching power supply 614 for pulse-modulating the rectified (i.e., direct current) power provided by the rectifier 612. The switching power supply 614 switches (i.e., turns on and off) to control its output to the motor 42e. By controlling the duration of each of the "on" and "off" events, the switching power supply 614 is able to apply power of a desired voltage to the motor 42e. A feedback loop 620 may optionally be included in the power supply 66e for more accurate control of the voltage. Similarly, the DC/DC converter 602 may include a switching power supply 624 that is similar to the switching power supply 614 of the AC/DC converter 600 in that it switches (i.e., turns on and off) to control its output to the motor 42e to thereby apply power of a desired voltage to the motor 42e. Consequently, electrical power of a relatively identical voltage may be provided to the motor 42e regardless of the voltage of the battery pack 28e.

Figure 21:
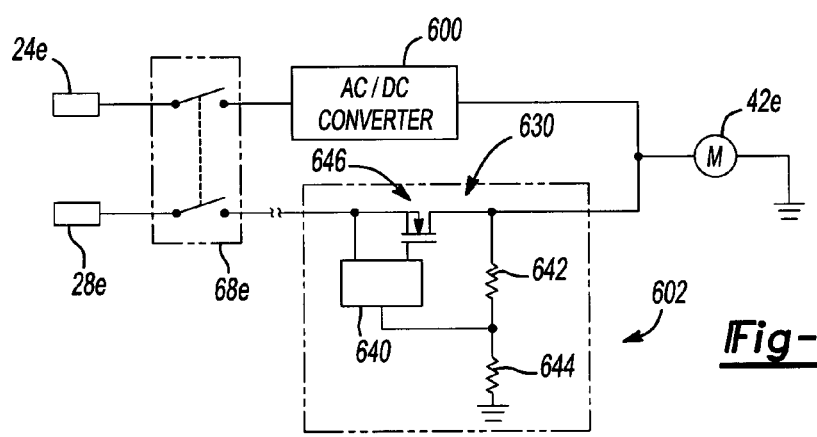
FIG. 21 is a schematic view of a portion of the wet/dry vacuum of FIG. 14 illustrating the switching device in greater detail.

The power supply 66e preferably includes a switch device 630 for automatically selecting the source of power for the wet/dry vacuum 10e. With reference to FIG. 21, the switch device 630 is illustrated to be optionally integrated with the DC/DC converter 602 and may include, for example, an integrated circuit 640, first and second resistors 642 and 644, respectively, and a transistor 646. The integrated circuit 640 may be configured such that if it receives power from the AC/DC converter 600, the integrated circuit 640 will turn the transistor 646 "off" so that the power from the battery pack 28e will not be transmitted to the motor 42e. Accordingly, the switch device 630 may be configured so that the battery pack 28e will power the vacuum 10e unless the vacuum 10e is coupled to a source of alternating current power in the manner described above.

Figure 21A:
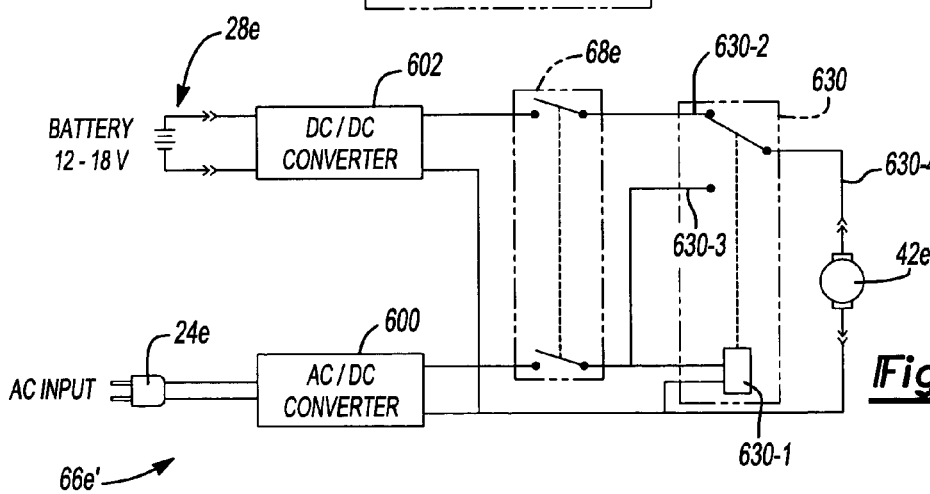
FIG. 21A is a schematic view similar to that of FIG. 21 but illustrating an alternately constructed controller.

With brief reference to FIG. 21A, an alternately constructed power supply 66e' is illustrated. The power supply 66e' differs from the power supply 66e of FIG. 21 in that the switch device 630 is associated with the AC/DC converter 600. More specifically, the switch device 630 is illustrated as being a relay 630-1 with first and second contacts 630-2, 630-3, respectively, that are employed to control the flow of electricity. The relay 630-1 is illustrated in its normal condition wherein a lead 630-4 from the motor 42e is electrically coupled to the first contact 630-2, which is in turn electrically coupled to the DC/DC converter 602 (via the power switch 68e). The relay 630-1 remains in its normal condition unless the AC/DC converter 600 provides power (through the power switch 68e in the example provided) to the relay 630-1. When the vacuum 10e is coupled to a source of alternating current power and the power switch 68e is switched on, the relay 630-1 causes the lead 630-4 from the motor 42e to be electrically coupled to the second contact 630-3, which is in turn electrically coupled to the AC/DC converter 600 (via the power switch 68e). Those skilled in the art will appreciate from this disclosure that the power supply, in its broader aspects, may be constructed somewhat differently and as such, the particular examples described and illustrated in this application are exemplary only and not intended to be limiting in any manner.

Returning to FIG. 18, the charger circuit 70e may be coupled to the power supply 66e and the receptacle assembly 64e. The charger circuit 70e allows for the charging of battery packs having different voltages, as is well known in the art. An example of a suitable charger circuit is disclosed in U.S. Pat. Nos. 6,427,070 and 6,496,688, the disclosures of which are hereby incorporated by reference as if fully set forth herein.

Accordingly, a user can charge a battery pack 28e, when the power supply 66e is coupled to a source of alternating current power by placing the battery pack 28e in the receptacle assembly 64e such that the terminals (not shown) of the connector (not shown) of the receptacle assembly 64e electrically engage the associated terminals (not shown) of the battery pack 28e. Once charged, the battery pack 28e may then be employed to power the vacuum 10e or removed from the receptacle assembly 64e and employed to power another device, such as the heavy-duty audio equipment of U.S. Pat. No. 6,427,070 or the cordless drill/driver of U.S. Pat. No. 6,431,289.

With brief reference to FIG. 14A, the housing 40e may be configured so as to define a recess 41e into which the power switch 68e is disposed. In the particular example provided, the power switch 68e is a toggle switch.

Returning to FIG. 14, the canister assembly 14e preferably includes a canister 100e and an over-center cam latching system 102e that employs a pair of over-center cam latches 700 to releasably secure the canister 100e to the powerhead assembly 12e. The particular canister 100e illustrated has a capacity of about two gallons, but those skilled in the art will appreciate that the canister 100e may in the alternative have a capacity that is larger or smaller. Preferably, the canister assembly 14e also includes a reservoir emptying means 101e that permits a liquid to be emptied from the interior of the canister 100e without removing the powerhead assembly 12e from the canister assembly 12e. The reservoir emptying means 101e may be a valve (not shown), such as a ball valve or gate valve. In the particular example provided, the reservoir empting means 101e includes a threaded boss 101-1, a gasket 101-2 and a threaded cap 101-3. The threaded boss 101-1 extends outwardly from the canister 100e and is threaded about at least a portion of its exterior surface. The threaded cap 101-3 includes an internal thread that is configured to threadably engage the threaded boss 101-1. The gasket 101-2, which is formed from a resilient, elastomeric material in the example provided, is disposed between the end of the threaded boss 101-1 and an interior surface of the threaded cap 101-3; the gasket 101-2 sealingly engages the end of the threaded boss 101-1 and the threaded cap 101-3 when the threaded cap 101-3 is tightened against the threaded boss 101-1.

In contrast to the filter system 16 of FIG. 1, the filter system 16e may be configured to be carried entirely by the powerhead assembly 12e as is shown in FIG. 15. The filter system 16e includes a shut-off device 740, a primary filter 114e and an optional secondary filter 116e. In the example provided, the secondary filter 116e may be a pad of fibrous material that is coupled to the fan inlet 742, but it could also be made of a mesh or screen material or omitted altogether depending upon the filtering capabilities of the primary filter 114e. Also, the secondary filter 116e may be coupled to the power head assembly 12e at a point after (downstream) of the fan 44e.

The shut-off device 740 is associated with the powerhead assembly 12e and configured to prevent the fan 44e from drawing a liquid into the fan inlet 742 when a volume of liquid in the canister assembly 14e exceeds a predetermined volume. The shut-off device 740 may be configured in various ways and may, for example, prevent electrical power from being transmitted to the motor 42e or close-off the fan inlet 742 in response to a volume of liquid in the canister assembly 14e increasing above the predetermined volume. In the particular example provided, the shut-off device 740 includes a plenum 110e and a float 112e. The plenum 110e may be a hollow, cage-like construction that permits air to flow therethrough and which serves to retain and guide the float 112e along a generally vertical axis. The float 112e, which is illustrated in the example provided as being a hollow sphere, is configured to rise automatically within the plenum 110e to close off the fan inlet 742e (to thereby halt the flow of air into the fan 44e and through the powerhead assembly 12e) when liquid in the canister 100e reaches a predetermined level. Those skilled in the art will appreciate from this disclosure that the float 112e may be configured with a shape that may not be spherical or even closed. For example, the float 112e may have a generally cylindrical shape that is closed on a single end.

The primary filter 114e may include a filter body 760, an internal support structure 762, a lower end cap 764 and an upper end cap 766. The filter body 760 may be formed from any appropriate filter material, including paper or fabric. In the particular example provided, however, the filter body is formed from a pleated material that is air and vapor permeable, but resistant to the infiltration or penetration of liquids therethrough so that the filter body 760 may be readily cleaned as through washing. Optionally, the material from which the filter body 760 is made is also hydrophobic and/or oleophobic so that the filter body 760 will not be wetted by water and/or oils that are drawn into the canister assembly 14e. Our testing has shown that one particularly suitable material for the filter body 760 is comprised of a filter media support bonded to a porous expanded PTFE membrane, with one such suitable material being marketed as Gore Wet/Dry Filter Products manufactured by W. L. Gore & Associates, a Delaware Corporation having a place of business in Elkton, Md. Also optionally, the filter body 760 may be configured to provide HEPA (high efficiency particulate air) filtration or ULPA (ultra low penetration air) filtration.

The internal support structure 762 may be a cage-like structure that is disposed about the interior of the filter body 760 and fixedly coupled to one or both of the lower and upper end caps 764 and 766. The internal support structure 762 is configured to axially and radially support the filter body 760 during the operation of the vacuum 10e to thereby prevent the filter body 760 from crushing or distorting in response to a pressure differential between the interior and exterior surfaces of the filter body 760.

The lower end cap 764 may be a plate-like structure that is formed from a rigid material and is sealingly bonded to a lower end of the filter body 760. Alternatively, the lower end cap 764 may be wholly or partially formed from the material from which the filter body 760 is manufactured.

The upper end cap 766 may be an annular flange that is sealingly bonded to an upper end of the filter body 760. With reference to FIGS. 15 and 22 through 24, the upper end cap 766 preferably includes a body 770 that defines a receiving aperture 772, which receives the plenum 110e therethrough when the primary filter 114e is coupled to the powerhead assembly 12e, a seal engagement structure 774, which is illustrated as extending axially from the body 770 and oriented generally concentric with the receiving aperture 772, and a plurality of retaining tabs 776 that are circumferentially spaced about the perimeter of the body 770 and which extend radially outward therefrom.

The seal engagement structure 774 is sized to engage a corresponding filter gasket 780 that is formed from an elastomeric material and disposed about the fan inlet 742 adjacent a lower surface of the housing 40e. In the particular embodiment illustrated, the filter gasket 780 is fixedly coupled to the housing 40e, but could alternatively be fixedly coupled to the upper end cap 766 or removably coupled to either the housing 40e or the upper end cap 766.

Figure 25:
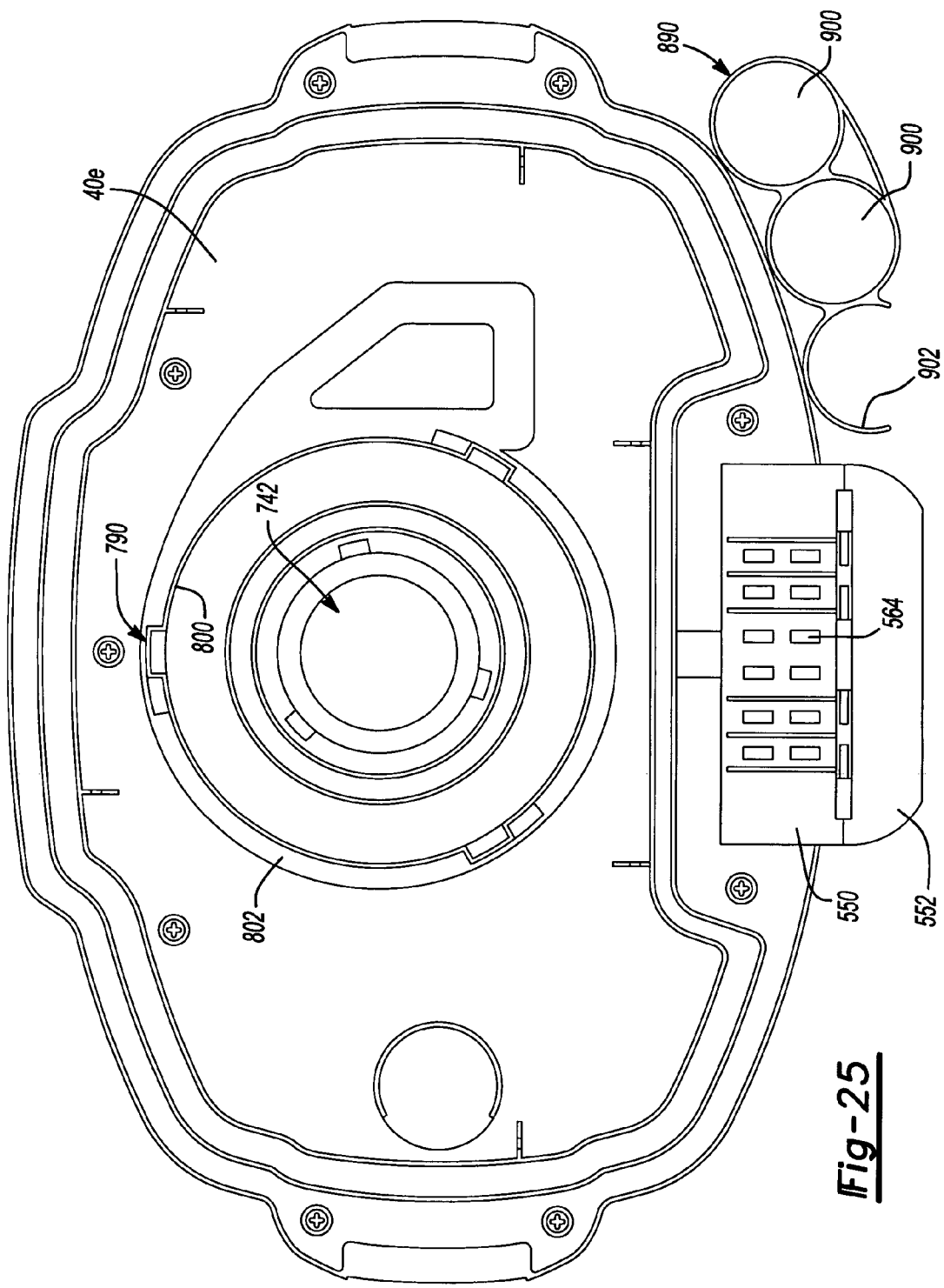
FIG. 25 is a bottom view of a portion of the wet/dry vacuum of FIG. 14 illustrating the housing of the powerhead assembly in greater detail.
Figure 26:
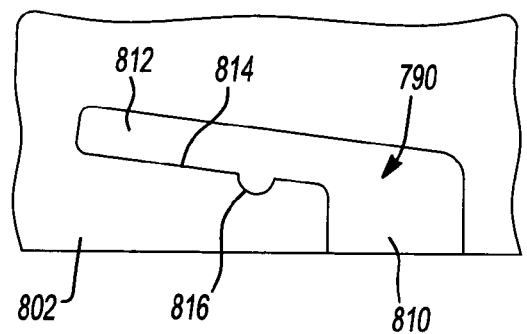
FIG. 26 is a side elevation view of a portion of the housing of the powerhead assembly illustrating one of the retaining slots in greater detail.

With additional reference to FIGS. 25 and 26, the retaining tabs 776 may be configured to matingly engage corresponding retaining slots 790 that are formed in the housing 40e in an area proximate the fan inlet 742. In the particular example provided, the retaining tabs 776 are illustrated as having a generally flat upper surface 792, a tapered lower surface 794 and an engagement feature 796.

The retaining slots 790 may be formed in the inner surface 800 of a collar 802 that extends generally perpendicularly from the bottom surface of the housing 40e concentric to the fan inlet 742. Each retaining slot 790 may be generally L-shaped, with a first portion 810, which is configured to axially receive a corresponding one of the retaining tabs 776, and a second portion 812 that extends around a portion of the circumference of the collar 802. The second portion 812 includes an engagement surface 814 that is configured to engage the lower surface 794 of a corresponding one of the retaining tabs 776. In the example provided, the engagement surface 814 is tapered and includes a notch-like retaining feature 816 that is configured to receive therein the engagement feature 796 of a corresponding one of the retaining tabs 776.

With reference to FIGS. 22, 23 and 26, when the primary filter 114e is to be coupled to the housing 40e, the primary filter 114e is installed over the plenum 110e and the retaining tabs 776 are each inserted to the first portion 810 of an associated retaining slot 790. The primary filter 114e may then be rotated to move the retaining tabs 776 into the second portion 812 of the retaining slots 790. With sufficient rotation of the primary filter 114e, the engagement features 796 of each of the retaining tabs 776 are coupled with an associated retaining feature 816 (i.e., received into an associated retaining feature 816 in the particular example provided) to thereby hinder opposite rotation of the primary filter 114e so that the primary filter 114e will not disengage the housing 40e during the operation of the vacuum 10e.

The tapered lower surface 794 on the retaining tabs 776 and the tapered engagement surface 814 cooperate when the primary filter 114e is being rotated so as to translate the primary filter 114e axially toward the housing 40e. In this way, the seal engagement structure 774 is forced into sealing engagement with the filter gasket 780 to thereby inhibit the introduction of liquids into the fan 44e from a point between the upper end cap 766 and the housing 40e. The ability to seal the primary filter 114e against the housing 40e is of particular importance in those instances where a HEPA or ULPA filter material is employed for the filter body 760, since the filter gasket 780 also inhibits debris from infiltrating between the housing 40e and the upper end cap 766.

In the particular example provided, both the second portion 812 of the retaining slots 790 and the tapered lower surfaces 794 of the retaining tabs 776 are tapered in a way that not only facilitates axial movement of the primary filter 114e as the primary filter 114e is rotated relative to the housing 40e but also distributes the load that is exerted by the resilient filter gasket 780 over the entire width of the retaining tabs 776. Those skilled in the art will appreciate, however, that the lower surface 794 of the retaining tabs 776 need not be tapered, and that the retaining tabs 776 and retaining slots 790 could, in the alternative, be formed on the housing 40e and the upper end cap 766, respectively.

Figure 16:
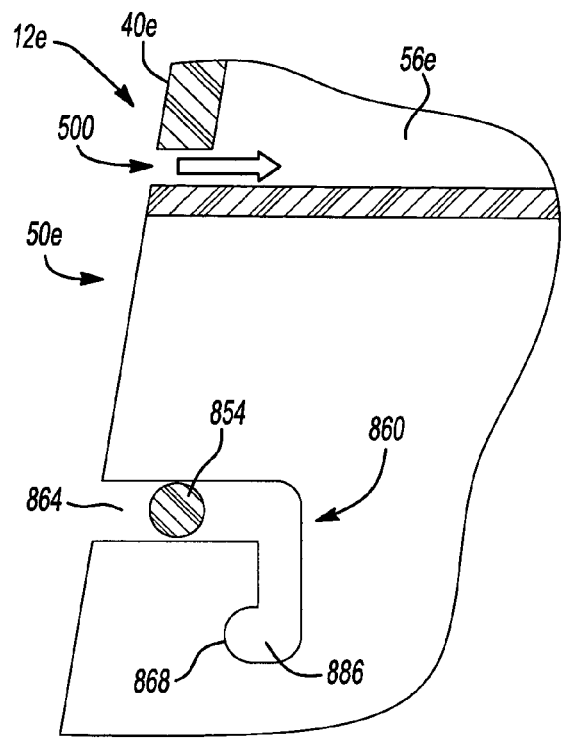
FIG. 16 is an enlarged portion of FIG. 15 illustrating the cooling inlet aperture in greater detail.
Figure 17:
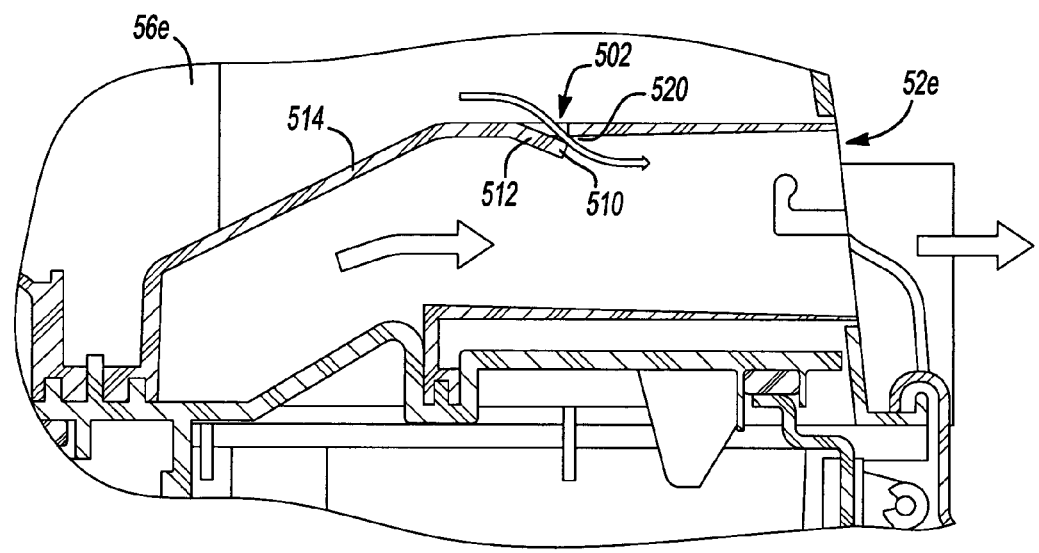
FIG. 17 is an enlarged portion of FIG. 15 illustrating the cooling outlet aperture in greater detail.
Figure 27:
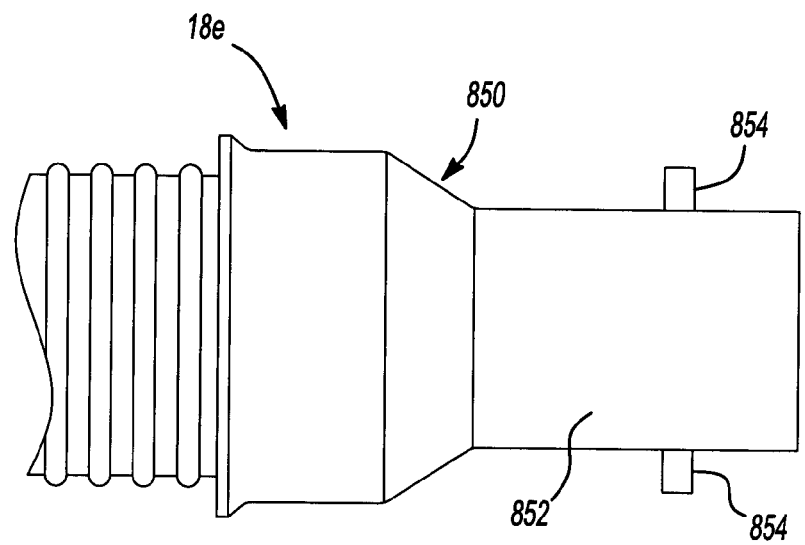
FIG. 27 is a top plan view of a portion of the wet/dry vacuum of FIG. 14 illustrating the coupling end of the hose assembly in greater detail.

With renewed reference to FIG. 15 and additional reference to FIG. 27, the hose assembly 18e is preferably a flexible vacuum hose which may be removably coupled to either the inlet port 50e or the outlet port 52e. In the example provided, the hose assembly 18e preferably includes a coupling end 850 with a tapered cylindrical body 852 and a pair of attachment lugs 854. The tapered cylindrical body 852 is constructed to be inserted into and frictionally engage a desired one of the inlet and outlet ports 50e and 52e. The attachment lugs 854 extend outwardly from the tapered cylindrical body 852 and are configured to be received into corresponding lug slots 860 formed in the walls of the inlet and outlet ports 50e and 52e. As best shown in FIGS. 15 and 16, each of the lug slots 860 may be L- or J-shaped having an insertion portion 864, which receives an associated one of the attachment lugs 854 when the coupling end 850 is axially inserted into the associated inlet or outlet port 50e or 52e, and a retaining portion 866, which extends around a portion of the inner circumference of the associated inlet or outlet port 50e or 52e. The terminal end 868 of the retaining portion 866 is somewhat elongated in a direction that is generally parallel to the insertion portion 864 so that when an attachment lug 854 is disposed therein and a force is applied to the hose assembly 18e that tends to withdraw it from the powerhead assembly 12e, the attachment lug 854 is able to move forwardly somewhat. As such, the exemplary coupling end 850 illustrated must be further inserted to the port and rotated to effect the uncoupling of the hose assembly 18e from the powerhead assembly 12e. The need to both further insert and rotate the coupling end 850 aids in resisting the uncoupling of the hose assembly 18e from the port at an undesired time.

With reference to FIG. 14, the opposite end 880 of the hose assembly 18e may be friction-fittable to any of the hose-end attachments 20e. Such hose-end attachments 20e are well known in the art and as such, a detailed discussion of their construction and use need not be provided herein. To ensure that the hose-end attachments 20e are secure and handy, the vacuum 10e preferably includes a tool retainer 890 that may be integrally formed with the housing 40e or discretely formed and coupled to the housing 40e, as with screws (not shown).

Figure 28:
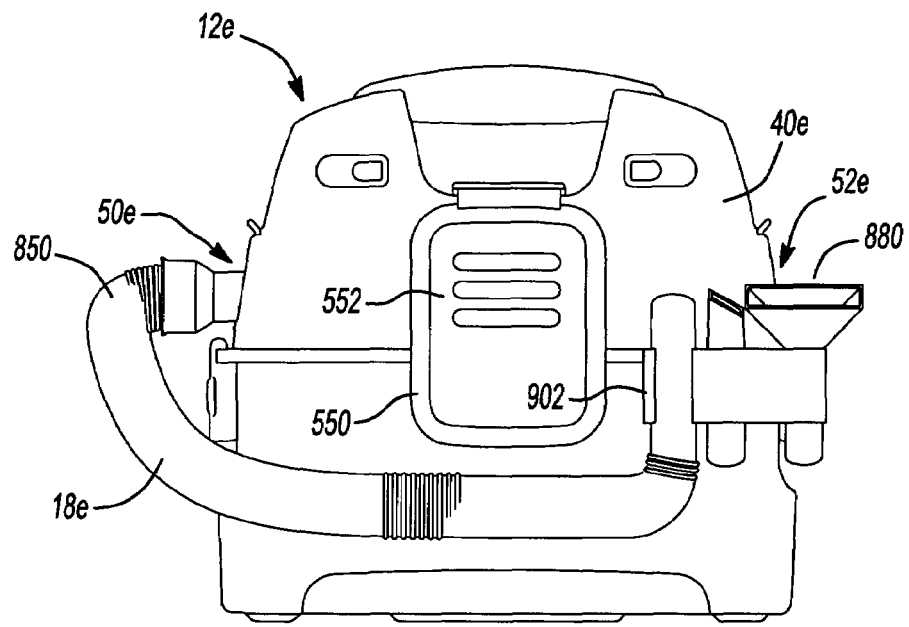
FIG. 28 is a rear elevation view of the wet/dry vacuum of FIG. 14 illustrating the hose assembly in a first stored condition.

In the example provided, the tool retainer 890 includes a pair of cylindrical recesses 900, which are configured to receive therein a crevice tool 20e' and a nozzle 20e'', and a C-shaped collar 802 that is configured to frictionally engage (i.e., clamp about the perimeter of) the hose assembly 18e. Accordingly, the user may store the hose assembly 18e in a storage position as shown in FIG. 28 by inserting the coupling end 850 of the hose assembly 18e to the inlet port 50e, wrapping the hose assembly 18e about a lateral side of the vacuum 10e such that the hose assembly 18e is captured below the battery enclosure 550 and lid 552 and clipping a portion of the hose assembly 18e into the C-shaped collar 802. With the hose assembly 18e thus stowed, the opposite end 880 of the hose assembly 18e is maintained in a stationary position, which may have additional utility in situations where the vacuum 10e is being operated to remove debris from an object and the user of the vacuum 10e is using one hand to hold an object and the other hand to aid in clearing debris from the object. Stated another way, the C-shaped collar 802 may be used as a "third hand" to hold the opposite end 880 of the hose assembly 18e as necessary. Preferably, the portion of the hose assembly 18e between the C-Shaped collar 802 and the coupling end 850 (i.e., the body of the hose assembly 18e) is in a state of tension (owing to the stretchy nature of the body of the hose assembly 18e) so that the body of the hose assembly 18e is secured to the housing 40 and canister 100e when the hose assembly 18e is placed in the storage position.

Figure 29:
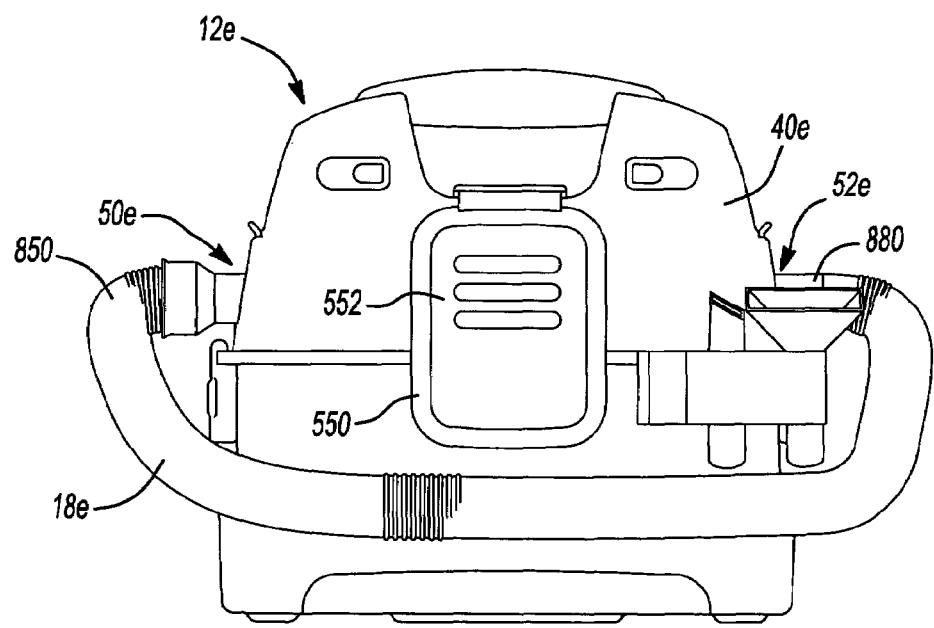
FIG. 29 is a view similar to that of FIG. 28 but illustrating the hose assembly in a second stored condition.

Alternatively, the coupling end 850 of the hose assembly 18e may be inserted to one of the inlet and outlet ports 50e and 52e, the hose assembly 18e wrapped about a lateral side of the vacuum 10e such that the hose assembly 18e is captured below the battery enclosure 550 and lid 552 and the opposite end 880 coupled to the other one of the inlet and outlet ports 50e and 52e as is illustrated in FIG. 29. Preferably, the portion of the hose assembly 18e between the opposite end 880 and the coupling end 850 (i.e., the body of the hose assembly 18e) is in a state of tension (owing to the stretchy nature of the body of the hose assembly 18e) so that the body of the hose assembly 18e is secured to the housing 40 and canister 100e when the hose assembly 18e is placed in this storage position.

Returning to FIG. 14, the shoulder strap 22e may be coupled to the powerhead assembly 12e to permit the user of the wet/dry vacuum 10e to selectively wear the unit over their shoulder so that their hands may be used for other tasks, including transporting other equipment or manipulating the hose assembly 18e when the wet/dry vacuum 10e is in use. In the particular embodiment illustrated, the shoulder strap 22e is coupled to the two clips 920 that extend from the housing 40e in areas proximate the inlet and outlet ports 50e and 52e.

Figure 30:
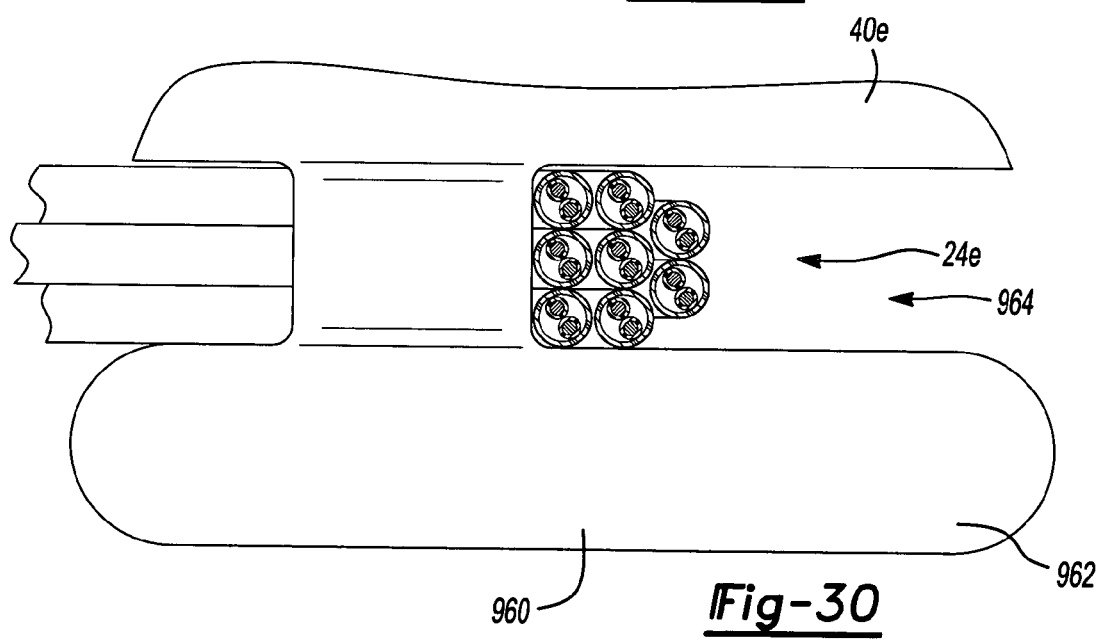
FIG. 30 is a top view of a portion of the wet/dry vacuum illustrating the electrical cord in a stored condition.

With additional reference to FIG. 30, an optional cord wrap 930 is also included with the vacuum 10e. In the example provided, the cord wrap 930 comprises two L-shaped brackets 960 that are coupled to the housing 40e. The brackets 960 include a large flange 962 that is spaced apart from the housing 40e to define therebetween a cord-wrap cavity 964 about which the electrical cord 24e may be wrapped for storage.

In FIG. 31, a tool set constructed in accordance with the teachings of the present invention is generally indicated by reference numeral 1000. The tool set 1000 includes various power tools 1002 and the above-described utility vacuum 10e, which includes the battery pack 28e. Each of the power tools 1002 are of a construction that includes a receptacle assembly 64e with a configuration that is compatible and preferably similar or identical to the receptacle assembly 64e of the utility vacuum 10e to thereby permit the battery pack 28e to be selectively coupled to a given one of the power tools 1002 to transmit electrical power thereto for the operation of the given power tool 1002. Advantageously, the battery pack 28e may be selectively coupled to any of the components of the tool set 1000 to thereby power the selected power tool 1002 or the utility vacuum 10e. While the particular power tools 1002 are illustrated to include a drill driver 1002a, a circular saw 1002b, a reciprocating saw 1002c and a flashlight 1002d, those skilled in the art will appreciate in light of this disclosure that the particular power tool may be of any desired type and may include, for example, hammer drills, jig saws, screw drivers, impact wrenches, rotary hammers, routers, spiral saws, plate joiners, metal working shears, grinders, sanders, buffers, self-leveling rotary lasers, manually-leveled rotary lasers and heavy-duty audio equipment.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for operating a battery-powered tool set, the tool set including a utility vacuum and a power tool, the utility vacuum having a powerhead assembly and a canister removably coupled to the powerhead assembly, the powerhead assembly including a powerhead housing, a fan inlet, a fan, a motor for providing rotary power to the fan, a receptacle assembly and an electric circuit, the method comprising:
    coupling a filter to the powerhead assembly such that the filter is located upstream and in fluid communication with the fan inlet;
    uncoupling the battery pack from the power tool;
    moving a lid that is movably coupled to the powerhead housing to expose the receptacle assembly;
    coupling the battery pack to the utility vacuum by sliding the battery pack into the receptacle assembly such that a plurality of battery pack terminals couple to a plurality of receptacle terminals associated with the receptacle assembly to thereby provide the utility vacuum with a cordless source of electrical power; and
    moving the lid to cover the battery pack and the receptacle assembly;
    wherein the receptacle assembly includes a receptacle housing that is coupled to and extends outwardly from the powerhead housing.

2. A utility vacuum comprising:
    a canister;
    a powerhead assembly coupled to the canister and having a fan inlet, a fan, a motor for providing rotary power to the fan, a receptacle assembly and an electric circuit for distributing electrical power to the motor, the fan being in fluid communication with the fan inlet;
    a filter coupled to the powerhead assembly and in fluid communication with the fan inlet upstream of the motor;
    a shut-off device associated with the powerhead assembly, the shut-off device being configured to prevent the fan from drawing a liquid into the fan inlet when a volume of the liquid in the canister exceeds a predetermined volume; and
    a flexible hose assembly that is configured to be coupled to the powerhead assembly;

wherein the electric circuit is adapted to receive a source of direct current power from a direct current power source and to provide the direct current power to the motor;

wherein the receptacle assembly includes a receptacle housing and a connector, the receptacle housing defining at least a portion of an exterior surface of the powerhead assembly and being adapted to receive a battery pack, the connector having a plurality of terminals that are configured to electrically detachably couple the battery pack to the electric circuit;

wherein the powerhead assembly includes an inlet and an outlet and wherein the hose assembly includes a hook that engages the powerhead assembly when the hose assembly is coupled to at least one of the inlet and the outlet to resist removal of the hose from the at least one of the inlet and the outlet;

wherein the hose assembly further includes a body that is configured to be received into the at least one of the inlet and the outlet; and wherein the hook includes at least one post that is disposed generally perpendicular to a longitudinal axis of the body.

3. A utility vacuum comprising:

a canister;

a powerhead assembly coupled to the canister and having a fan inlet, a fan, a motor for providing rotary power to the fan, a receptacle assembly and an electric circuit for distributing electrical power to the motor, the fan being in fluid communication with the fan inlet;

a flexible hose that is configured to be coupled to the powerhead assembly;

a filter coupled to the powerhead assembly and in fluid communication with the fan inlet upstream of the motor; and a shut-off device associated with the powerhead assembly, the shut-off device being configured to prevent the fan from drawing a liquid into the fan inlet when a volume of the liquid in the canister exceeds a predetermined volume;

wherein the electric circuit is adapted to receive a source of direct current power from a direct current power source and to provide the direct current power to the motor; and wherein the receptacle assembly includes a receptacle housing and a connector, the receptacle housing defining at least a portion of an exterior surface of the powerhead assembly and being adapted to receive a battery pack, the connector having a plurality of terminals that are configured to electrically detachably couple the battery pack to the electric circuit;

wherein the powerhead assembly includes a housing in which the fan, the motor and the electric circuit are housed, the housing including an inlet and an outlet, wherein operation of the utility vacuum draws an intake flow of air into the canister through the inlet and discharges a discharge flow of air through the outlet, wherein a compartment is defined by the housing and a lid, the lid being rotatable relative to the housing between an open condition and a closed condition, and wherein the battery is adapted to be received in the compartment;

wherein the utility vacuum further comprise a latch that can be engaged to maintain the lid in the second condition, the latch including a first latch element that is coupled to the lid and a second latch element that is coupled to the housing, the first and second latch elements being engaged to one another to engage the latch, and wherein the second latch element is not threaded; and wherein the inlet and the outlet are located on opposite sides of the housing and the flexible hose is positionable in a storage position wherein a first end of the flexible hose is coupled to the inlet and a second end of the flexible hose opposite the first end is received in the outlet.

4. A utility vacuum comprising:

a canister;

a powerhead assembly coupled to the canister and having a fan inlet, a fan, a motor for providing rotary power to the fan, a receptacle assembly and an electric circuit for distributing electrical power to the motor, the fan being in fluid communication with the fan inlet;

a flexible hose that is configured to be coupled to the powerhead assembly;

a filter coupled to the powerhead assembly and in fluid communication with the fan inlet upstream of the motor;

a shut-off device associated with the powerhead assembly, the shut-off device being configured to prevent the fan from drawing a liquid into the fan inlet when a volume of the liquid in the canister exceeds a predetermined volume; and at least one accessory that is removably coupled to the hose;

wherein the electric circuit is adapted to receive a source of direct current power from a direct current power source and to provide the direct current power to the motor; and wherein the receptacle assembly includes a receptacle housing and a connector, the receptacle housing defining at least a portion of an exterior surface of the powerhead assembly and being adapted to receive a battery pack, the connector having a plurality of terminals that are configured to electrically detachably couple the battery pack to the electric circuit;

wherein the powerhead assembly includes a housing in which the fan, the motor and the electric circuit are housed, the housing including an inlet and an outlet, wherein operation of the utility vacuum draws an intake flow of air into the canister through the inlet and discharges a discharge flow of air through the outlet, wherein a compartment is defined by the housing and a lid, the lid being rotatable relative to the housing between an open condition and a closed condition, and wherein the battery is adapted to be received in the compartment; and wherein the utility vacuum further comprise a latch that can be engaged to maintain the lid in the second condition, the latch including a first latch element that is coupled to the lid and a second latch element that is coupled to the housing, the first and second latch elements being engaged to one another to engage the latch, and wherein the second latch element is not threaded.

5. A utility vacuum comprising:

a canister;

a powerhead housing that includes a handle, a pair of tubular members and a fan inlet, the handle being configured to permit the utility vacuum to be hand carried;

a receptacle assembly coupled to the powerhead housing;

a motor coupled to the powerhead housing;

an electric circuit coupled to the powerhead housing and electrically coupled to the motor;

a fan driven by the motor to produce a discharge flow that is routed to the outlet, the fan being in fluid communication with the fan inlet;

a pair of latches coupled to one of the canister and the powerhead housing, the latches being configured to releasably latch the canister and the powerhead housing together;

a shut-off device that includes a plenum and a float, the plenum being in fluid communication with the housing proximate the fan inlet, the float being disposed in the plenum and being configured to close the fan inlet when the powerhead housing is releasably latched to the canister and a volume of a liquid in the canister exceeds a predetermined volume;

a filter coupled to the shut-off device; and a flexible hose that is removably coupled to at least one of the inlet and the outlet;

wherein a debris-laden air flow is adapted to be drawn into a first one of the pair of tubes during operation of the fan;

wherein an exhaust flow of air is adapted to be expelled from the second one of the pair of tubes during operation of the fan;

wherein an annular space is formed about one of the first and second tubes and a flow of air that is employed for cooling the motor is moved through the annular space;

wherein the receptacle assembly includes a receptacle housing and a connector, the housing being is adapted to receive a battery pack, the connector having a plurality of terminals that are configured to electrically detachably couple the battery pack to the electric circuit.

6. The utility vacuum of claim 5, wherein the flow of air for cooling the motor enters the powerhead housing through the annular space.

7. A utility vacuum comprising:
a canister;
a drain plug that is removably coupled to the canister;
a powerhead assembly coupled to the canister and having a fan inlet, a fan, a motor for providing rotary power to the fan, a receptacle assembly and an electric circuit for distributing electrical power to the motor, the fan being in fluid communication with the fan inlet;
a flexible hose that is configured to be coupled to the powerhead assembly;
a shut-off device associated with the powerhead assembly, the shut-off device being configured to prevent the fan from drawing a liquid into the fan inlet when a volume of the liquid in the canister exceeds a predetermined volume; and
a filter coupled to the shut-off device;
wherein the electric circuit is adapted to receive a source of direct current power from a direct current power source and to provide the direct current power to the motor; and
wherein the receptacle assembly includes a receptacle housing that is adapted to receive a battery pack and a connector with a plurality of terminals that are configured to electrically detachably couple the battery pack to the electric circuit;
wherein the powerhead assembly includes a housing in which the fan, the motor and the electric circuit are housed, the housing including an inlet and an outlet, wherein operation of the utility vacuum draws an intake flow of air into the canister through the inlet and discharges a discharge flow of air through the outlet, wherein a compartment is defined by the housing and a lid, the lid being movable relative to the housing between an open condition and a closed condition, and wherein the battery is received in the compartment;
wherein the flexible hose has a first end, a second end opposite the first end and a body interconnecting the first and second ends, the flexible hose being positionable in a storage position wherein the first end is coupled to the inlet and the body is wrapped about the utility vacuum;
wherein the second end of the flexible hose is received in the outlet when the flexible hose is positioned in the storage position;
wherein the powerhead assembly includes an inlet and an outlet and wherein the hose assembly includes a hook that engages the powerhead assembly when the hose assembly is coupled to at least one of the inlet and the outlet;
wherein the hose assembly further includes a body that is configured to be received into the at least one of the inlet and the outlet;
wherein the hook includes at least one post that is disposed generally perpendicular to a longitudinal axis of the body.
wherein the inlet and the outlet are located on opposite sides of the housing and the flexible hose is positionable in a storage position wherein a first end of the flexible hose is coupled to the inlet and a second end of the flexible hose opposite the first end is received in the outlet;
wherein the powerhead assembly includes a housing in which the fan and the motor are housed and wherein the shut-off device includes a plenum that is disposed in fluid communication with the fan inlet;
wherein one of the power head and the canister includes an over-center latch to detachably couple the canister to the power head assembly;
wherein the utility vacuum further comprises a lid that cooperates with the housing to define a compartment, wherein the lid is movably coupled to the housing; and
wherein the canister has a capacity of about 2 gallons.

8. A utility vacuum comprising:
a canister;
a powerhead assembly coupled to the canister and having a fan inlet, a fan, a motor for providing rotary power to the fan, a receptacle assembly and an electric circuit for distributing electrical power to the motor, the fan being in fluid communication with the fan inlet;
a filter in fluid communication with the fan inlet;
a shut-off device associated with the powerhead assembly, the shut-off device being configured to prevent the fan from drawing a liquid into the fan inlet when a volume of the liquid in the canister exceeds a predetermined volume; and
a battery pack providing a source of direct current electrical power for powering the motor, the battery pack including a housing and having a plurality of battery pack terminals;
wherein the receptacle assembly includes a receptacle housing, which is configured to receive the battery pack, and a connector with a plurality of terminals that are configured to electrically couple the battery to the electric circuit; and
wherein the battery is detachably coupled to the powerhead assembly;
wherein the powerhead assembly includes a housing in which the fan, the motor and the electric circuit are housed, the housing including an inlet and an outlet, wherein operation of the utility vacuum draws an intake flow of air into the canister through the inlet and discharges a discharge flow of air through the outlet;
wherein the battery pack is housed in a compartment, the compartment being defined by the housing and a lid, the lid being movable relative to the housing between a first condition, which permits ingress of the battery to the compartment and egress of the battery pack from the compartment, and a second condition, in which ingress of the battery pack to the compartment and egress of the battery pack from the compartment is inhibited; and wherein a cooling air intake aperture and a cooling air discharge aperture are formed in the powerhead assembly, the cooling air discharge aperture being associated with the outlet so that air flowing through the outlet blows across the cooling air discharge aperture to set up a zone of relatively low pressure that causes air to be drawn out of the cooling air discharge aperture to thereby cool the motor.

9. The utility vacuum of claim 8, wherein the cooling air intake aperture is positioned proximate the inlet.

10. The utility vacuum of claim 9, wherein the cooling air intake aperture is positioned concentric about the inlet.

11. The utility vacuum of claim 2, wherein a cooling air intake aperture and a cooling air discharge aperture are formed in the powerhead assembly, the cooling air discharge aperture being associated with the outlet so that air flowing through the outlet blows across the cooling air discharge aperture to set up a zone of relatively low pressure that causes air to be drawn out of the cooling air discharge aperture to thereby cool the motor.

12. The utility vacuum of claim 11, wherein the cooling air intake aperture is positioned proximate the inlet.

13. The utility vacuum of claim 11, wherein the cooling air intake aperture is positioned concentric about the inlet.

* * * * *